(12) United States Patent
Hwang et al.

(10) Patent No.: US 11,012,132 B2
(45) Date of Patent: May 18, 2021

(54) EFFICIENT BEAM SEARCH METHODS FOR THREE-DIMENSIONAL BEAMFORMING WITH NON-PRECODED REFERENCE SIGNALS

(71) Applicant: Apple Inc., Cupertino, CA (US)

(72) Inventors: Yeong-Sun Hwang, Oberhaching (DE); Franz Eder, Neubiberg (DE); Ziyang Ju, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/488,618

(22) PCT Filed: Mar. 12, 2018

(86) PCT No.: PCT/US2018/021912
§ 371 (c)(1),
(2) Date: Aug. 26, 2019

(87) PCT Pub. No.: WO2018/182954
PCT Pub. Date: Oct. 4, 2018

(65) Prior Publication Data
US 2020/0052755 A1    Feb. 13, 2020

(30) Foreign Application Priority Data

Mar. 31, 2017    (EP) .................................... 17164097

(51) Int. Cl.
*H04B 7/06*    (2006.01)
*H04L 25/02*    (2006.01)

(52) U.S. Cl.
CPC .......... *H04B 7/0617* (2013.01); *H04B 7/063* (2013.01); *H04B 7/0632* (2013.01);
(Continued)

(58) Field of Classification Search
CPC .. H04B 7/0617; H04B 7/0632; H04B 7/0695; H04L 25/0228; H04L 25/0204
(Continued)

(56) References Cited

U.S. PATENT DOCUMENTS 5,956,642 A * 9/1999 Larsson ................ H04L 5/0032
455/449
2011/0293025 A1* 12/2011 Mudulodu ............ H04L 5/0053
375/260
(Continued)

OTHER PUBLICATIONS

Costa et al., "Interference mitigation based on precoded SRS", 2016 IEEE Sensor Array and Multichannel Signal Processing Workshop (SAM), Jul. 2016, 5 pages, IEEE.
(Continued)

*Primary Examiner* — Kevin M Burd
(74) *Attorney, Agent, or Firm* — Kowert, Hood, Munyon, Rankin & Goetzel, P.C.

(57) ABSTRACT

A method and apparatus for three-dimensional beamforming, which include an estimation of a channel spatial coherence for a beam space of a device based on a plurality of non-precoded reference signals such that the beam space includes a plurality of beam subspaces based on the estimated channel spatial coherence and each of the plurality of beam subspaces include a beam direction representative of a respective beam subspace of the plurality of beam subspaces. Furthermore, a selection a beam subspace of the plurality of beam subspaces based on a channel quality metric of the beam direction that is representative of the beam subspace is included.

20 Claims, 16 Drawing Sheets

(52) U.S. Cl.
CPC ......... *H04B 7/0634* (2013.01); *H04B 7/0695* (2013.01); *H04L 25/0204* (2013.01); *H04L 25/0228* (2013.01)

(58) Field of Classification Search
USPC .......................................................... 375/267
See application file for complete search history.

(56) References Cited

U.S. PATENT DOCUMENTS

2015/0071367 A1    3/2015  Hwang et al.
2018/0131486 A1*   5/2018  Liu ..................... H04W 72/046

OTHER PUBLICATIONS

Yadav et al., "Linear Precoder Design for Doubly Corrrelated Partially Coherent Fading MIMO Channels", IEEE Transactions on Wireless Communications, Jul. 2014, pp. 3621-3635, vol. 13, No. 7, IEEE.
Extended European Search Report received for the priority application No. 17164097.2 dated Oct. 12, 2017, 9 pages.
International Search Report and Written Opinion of the International Searching Authority received for the corresponding application No. PCT/US2018/021912 dated Jul. 5, 2018, 15 pages.

* cited by examiner

Branching

Branching w/ Non-Overlapping Subspaces

Branching w/ Level 1 Overlapping Subspaces

Breadth-First Bounding

Breadth-First Bounding

Best-First Bounding

990

Estimating a channel spatial coherence for a beam space of a terminal device based on a plurality of non-precoded reference signals
992

Selecting, by the terminal device, a beam subspace of the beam subspaces based on a channel quality metric of the beam direction that is representative of the selected beam subspace
994

Estimating a channel spatial coherence for a beam space of a terminal device based on a plurality of non-precoded reference signals
996

Selecting, by the terminal device, a beam subspace of the beam subspaces based on a channel quality metric of the beam direction that is representative of the selected beam subspace
997

Generating, by the terminal device, a feedback signal indicating the beam direction that is representative of the selected beam space
998

FIG. 9B

EFFICIENT BEAM SEARCH METHODS FOR THREE-DIMENSIONAL BEAMFORMING WITH NON-PRECODED REFERENCE SIGNALS

CROSS-REFERENCE TO RELATED APPLICATIONS

This patent application is a national stage entry under 35 U.S.C. §§ 365 and 371 of International Application Serial No. PCT/US2018/021912, filed on Mar. 12, 2018, which claims priority to European Patent Application Serial No. 17 164 097.2, filed Mar. 31, 2017. The disclosures of each of the foregoing documents are incorporated herein by reference in their entirety and for all purposes.

TECHNICAL FIELD

Various aspects described herein relate generally to methods and devices for three-dimensional beamforming, and more particularly to three-dimensional beamforming with non-precoded reference signals.

BACKGROUND

In newer generations of three-dimensional beamforming systems with finer beam resolution, the size of the codebook can pose receiver implementation challenges. Three-dimensional beamforming systems with non-precoded reference signals include the Third Generation Partnership Project (3GPP) Long Term Evolution (LTE) Full Dimensional Multiple Input Multiple Output (FD-MIMO) Class A configurations, where a codebook size for a given rank can reach up to 2,048 beam directions in Release-13 and even larger in later Releases. Therefore, the computational burden on a receiver can be sufficiently large enough to make an exhaustive search in determining a preferred beam direction impractical.

BRIEF DESCRIPTION OF THE DRAWINGS

In the drawings, the same reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 9A shows a branching and bounding method according to an eighth implementation of the disclosure;

FIG. 9B shows a branching and bounding method according to a ninth implementation of the disclosure;

DESCRIPTION

Figure 1:
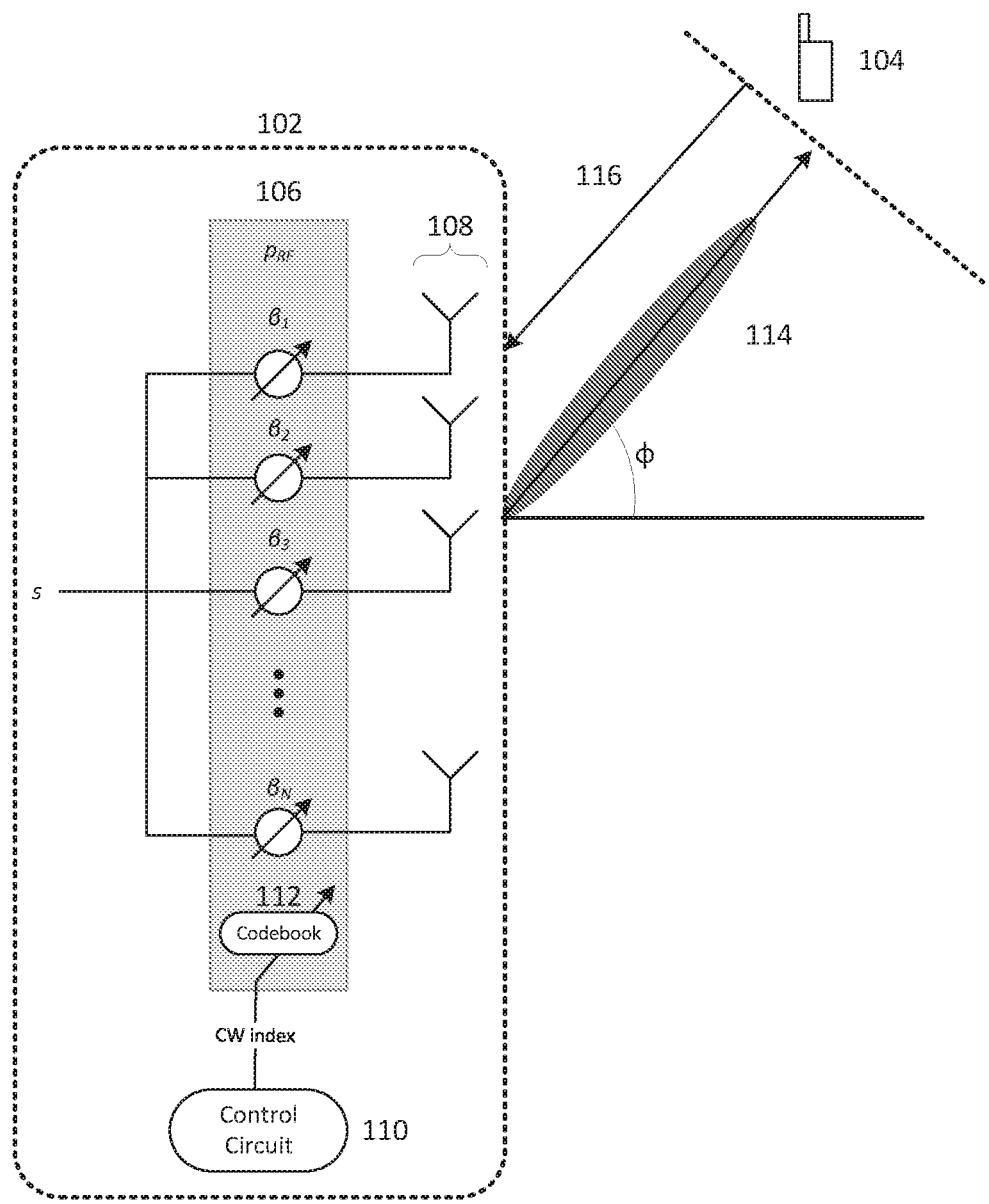
FIG. 1 shows an exemplary three-dimensional beamforming system.

The following detailed description refers to the accompanying drawings that show, by way of illustration, specific details and aspects in which the disclosure may be practiced.

Throughout the drawings, it should be noted that like reference numbers are used to depict the same or similar elements, features, and structures.

The word "exemplary" is used herein to mean "serving as an example, instance, or illustration." Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more. The terms "proper subset," "reduced subset," and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

A wide range of communication systems employ techniques to improve system performance. Link adaptation techniques, for instance, may involve the modification of a transmit signal based on channel state information (CSI) to enhance throughput performance. CSI is information which represents the state of a communication link between a transmitter and a receiver. CSI may be represented as transmission parameters, such as modulation and coding scheme (MCS), transmission rank, beam direction, and precoding matrix. In some communication systems with reciprocal channels, CSI can be obtained at the transmitter. In many communication systems, however, this information is instead estimated at the receiver and then fed back to the transmitter.

The estimation of CSI at a receiver may be based on a reception performance prediction metric. One such metric, referred to as a channel quality metric, is based on reference signals (e.g., pilot signals) that are provided by the transmitter. The form of the reference signals may vary from one communication system to another.

In a beamforming system, these reference signals may be precoded (i.e., beamformed) or non-precoded (i.e., not beamformed). Precoded references signals may be designed to sweep through a set of predefined beams. By contrast, however, non-precoded reference signals bear no beam specific information. A device, such as a receiver (i.e., beamformee), of a particular beamforming system may estimate the CSI and convey the estimated CSI to another device, like a transmitter (i.e., beamformer) based on reference signals received therefrom. The CSI that is estimated by, for example, a receiver may include at least one indicator identifying one or more preferred beam directions, which correspond to a highest channel quality metric value or values.

The determination of a preferred beam direction from among the number of candidate beam directions contributes to the computation burden at the receiver in a beamforming system. This challenge is especially acute in three-dimensional (3D) beamforming systems because a beam is associated with two spatial dimensions (i.e., azimuth and elevation) as opposed to one spatial dimension (i.e., azimuth) in conventional beamforming systems. The trend in wireless communications toward more powerful beamforming via smaller beamwidth, as in massive Multiple Input Multiple Output (MIMO) systems, only amplifies the challenge.

In beamforming systems based on non-precoded reference signals, the computational burden of searching through the entire beam search space (i.e., beam space) falls solely on the receiver. This is because any given observation for CSI estimation bears no beam-specific information. In this regard, the receiver may conduct a global search over the beam space based on a codebook agreed between the transmitter and the receiver to uniquely identify each beam direction. This is in contrast to the beamforming systems that use precoded reference signals, where the receiver burden can be comparatively simplified since the reference signals are designed to sweep through a set of predefined beams, i.e. much of the beam search workload at receivers can be traded-off for reference signal overhead in the system.

Although the following description may focus on a receiver beamforming context, skilled persons will appreciate the ability to likewise use an analogous implementation for transmit beamforming.

FIG. 1 shows an exemplary three-dimensional beamforming system 100. In accordance with some aspects, the three-dimensional beamforming system 100 includes a wireless transmitter 102 and a terminal device 104. The wireless transmitter 102 may include a radio frequency (RF) phase shifter array 106, antenna array 108, and a control circuit 110. The phase shifter array 106 may include a codebook memory 112 having a set of codewords β stored therein.

In at least one aspect, wireless transmitter 102 may utilize a codebook-based control approach in which control circuit 110 may provide the RF phase shifter array 104 with control signaling in the form of codeword (CW) indices. Control circuit 110 may select a codeword based on the direction or angle of a target point, such as by determining an optimal direction/angle estimation from a feedback signal 116 from a terminal device 104, and selecting the codeword that provides a direction or angle that most closely matches the preferred direction or angle indicated by the CSI of the received feedback signal 116. RF phase shifter array 104 may then access codebook memory 112 to retrieve the corresponding codeword $\beta=[\beta_1 \beta_2 \ldots \beta_N]$, where each $\beta_n$, $n=1, \ldots, N$ gives the assigned phase shift for the $n^{th}$ RF phase shifter of the RF phase shifter array 106. RF phase shifter array 106 may then apply the phase shift values $\beta_n$, $n=1, \ldots, N$, at each respective phase shifter in order to generate the antenna beam pattern 114 corresponding to the specified codeword β at antenna array 108.

While FIG. 1 depicts a specific implementation of a three-dimensional beamforming system 100, it should be noted that the disclosure is not limited to this illustrative system or the configuration therein. One of ordinary skill in the art will recognize that other types of beamforming systems having a different number of components, elements, architectures and/or arrangements thereof are contemplated by this disclosure.

Figure 2:
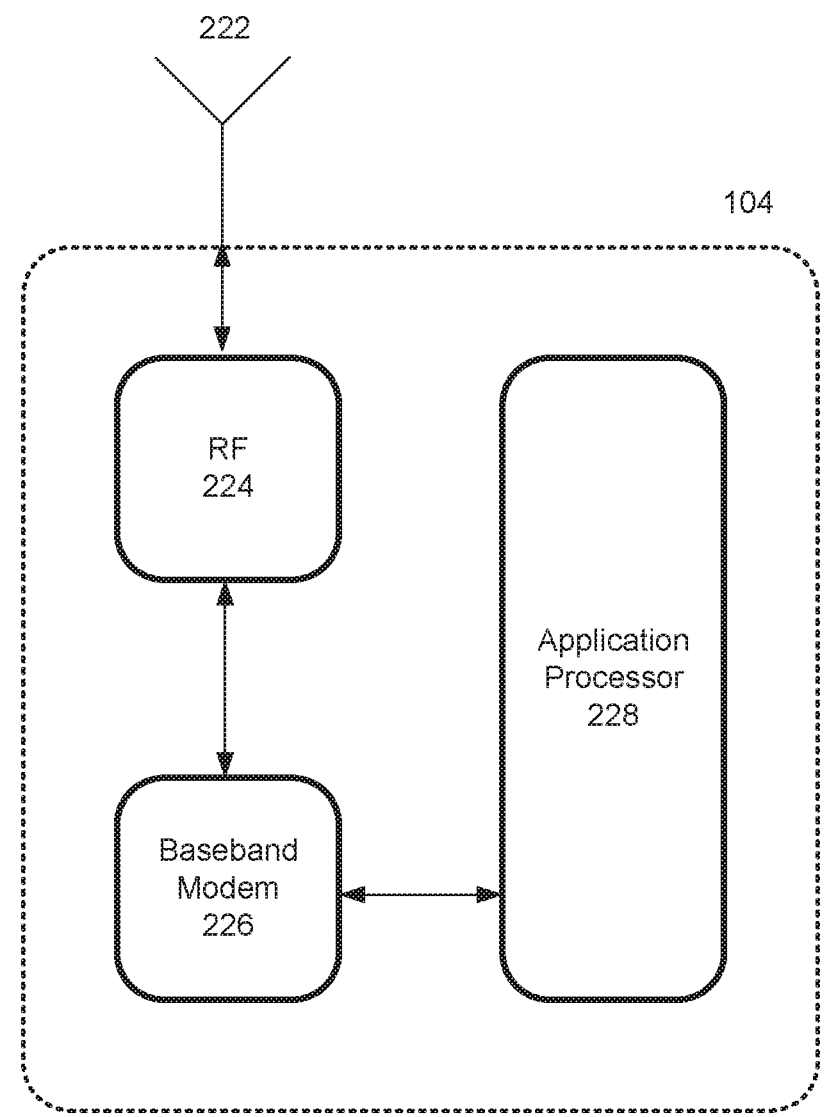
FIG. 2 shows a first exemplary configuration of a terminal device.

FIG. 2 shows an exemplary configuration 200 of a terminal device 104. In accordance with some aspects, the terminal device 104 may include antenna system 222, RF transceiver 224, baseband modem 226, and application processor 228. Terminal device 102 may have one or more additional components not explicitly depicted in FIG. 2, such as additional hardware, software, and/or firmware elements including processors, microprocessors, controllers, microcontrollers, memory, and/or other specialty or generic hardware, processors, circuits, etc., in order to support a variety of additional operations. Terminal device 104 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) ("SIM"), etc.

In an abridged overview of the operation of terminal device 104, terminal device 104 may be configured to transmit and/or receive wireless signals according to one or more wireless access protocols or RATs, including any one or combination of 5G, LTE, WLAN, Wi-Fi, UMTS, GSM, Bluetooth, CDMA, WCDMA, etc. The RAT capabilities of terminal device 104 may be determined by one or more SIMs included in terminal device 104 (not explicitly shown). It is appreciated that separate components may be provided for each distinct type of compatible wireless signals, such as a dedicated 5G antenna, 5G RF transceiver, and dedicated 5G baseband modem for 5G reception and transmission, a dedicated UMTS antenna, UMTS RF transceiver and UMTS baseband modem, a dedicated Wi-Fi antenna, Wi-Fi RF transceiver, and Wi-Fi baseband modem for Wi-Fi reception and transmission, etc., in which case antenna system 222, RF transceiver 224, and baseband modem 226 may each respectively be an antenna system, RF transceiver system, and a baseband modem system composed of the individual dedicated components. Alternatively, one or more components of the terminal device 104 may be shared between different wireless access protocols, such as, e.g., by sharing antenna system 222 between multiple different wireless access protocols, e.g. by using a common RF transceiver 224 shared between multiple wireless access protocols, e.g. a common baseband modem 226 shared between multiple wireless access protocols, etc. In an exemplary aspect of disclosure, RF transceiver 224 and/or baseband modem 226 may be operated according to multiple mobile communication access protocols (i.e., "multi-mode"), and thus may be configured to support one or more of LTE, UMTS, and/or GSM access protocols.

Further to the abridged overview of operation of terminal device 104, RF transceiver 224 may receive radio frequency wireless signals via antenna system 222, which may be implemented as, e.g., a single antenna or an antenna array composed of multiple antennas. RF transceiver 224 may include various reception circuitry components, which may include analog circuitry configured to process externally received signals such as, e.g., mixing circuitry to convert externally received RF signals to baseband and/or intermediate frequencies. RF transceiver 224 may also include amplification circuitry to amplify externally received signals, such as power amplifiers ("PA"s) and/or Low Noise Amplifiers ("LNA"s), although it is appreciated that such components may also be implemented separately from RF transceiver 224. RF transceiver 224 may additionally include various transmission circuitry components configured to transmit internally received signals, such as, e.g., baseband and/or intermediate frequency signals provided by baseband modem 226, which may include mixing circuitry to modulate internally received signals onto one or more radio frequency carrier waves and/or amplification circuitry to amplify internally received signals before transmission. RF transceiver 224 may provide such signals to antenna system 222 for wireless transmission. Further references herein to reception and/or transmission of wireless signals by terminal device 104 may thus be understood as an interaction between antenna system 222, RF transceiver 224, and baseband modem 226 as detailed above. Although not explicitly depicted in FIG. 2, RF transceiver 224 may be additionally be connected to application processor 228.

Figure 3:
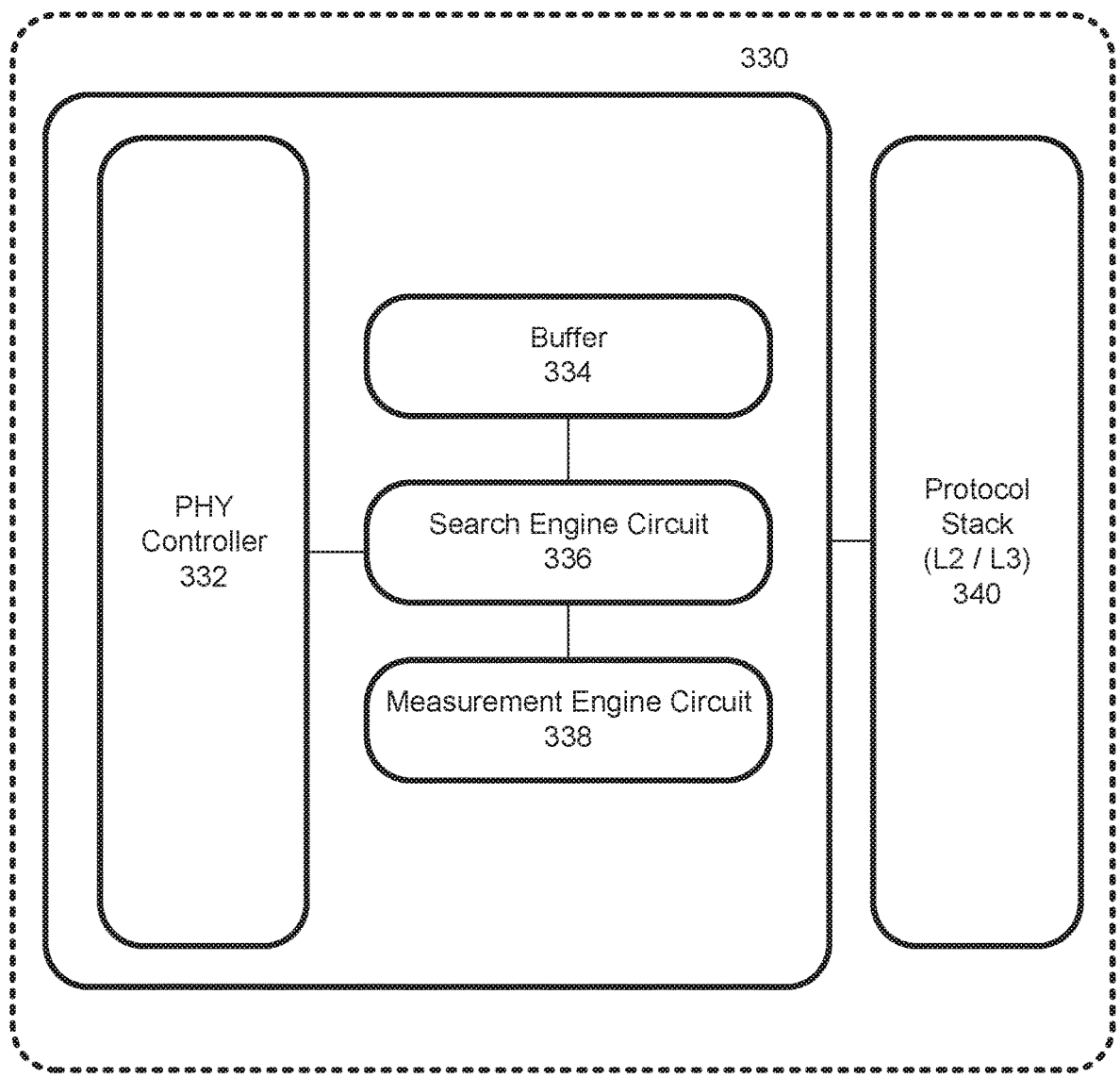
FIG. 3 shows an exemplary internal configuration of a baseband modem.

FIG. 3 shows an exemplary internal configuration of a baseband modem 226. In accordance with some aspects, baseband modem 226 may include a physical layer ("PHY," Layer 1) subsystem 330 and a protocol stack (Layers 2 and 3) subsystem 340. Although not explicitly shown in FIG. 3, baseband modem 226 may additionally include various additional baseband processing circuitry, such as Analog to Digital Converters ("ADC"s) and/or Digital to Analog Converters (DACs), modulation/demodulation circuitry, encoding/decoding circuitry, audio codec circuitry, digital signal processing circuitry, etc.

Baseband modem 226 may be responsible for mobile communication functions of terminal device 104, and may be configured to operate in conjunction with RF transceiver 224 and antenna system 222 to transmit and receive mobile communication signals in accordance with various mobile communication protocols. Baseband modem 226 may be responsible for various baseband signal processing operations for both uplink and downlink signal data. Accordingly, baseband modem 226 may obtain and buffer baseband downlink and uplink signals and subsequently provide the buffered downlink signals to various internal components of baseband modem 226 for respective processing operations.

PHY subsystem 330 may be configured to perform control and processing of physical layer mobile communication functions, including error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. In accordance with some aspects, PHY subsystem 330 may include signal buffer 334, which may be a memory component configured to hold digital signal samples, e.g., as obtained via RF transceiver 224 or protocol stack subsystem 340. Search engine 336, measurement engine 338, and additional signal processing components of PHY subsystem 330 may be configured to access signal buffer 334 and process the baseband digital samples according to the corresponding signal processing functions of the respective components. Buffer 334 is represented as a single component in FIG. 3 for simplicity, and alternatively each component or given groups of components may have a dedicated buffer to hold digital signal samples for processing. Although not explicitly depicted in FIG. 3, the aforementioned functionality of PHY subsystem 330 may be realized as hardware and/or software (program code executed on a processor) components under the control of PHY controller 330. Skilled persons will appreciate the ability to implement the algorithmic, control, and I/O logic for such signal processing operations as either hardware or software logic with substantially equivalent functionality. Likewise, PHY subsystem 330 may additionally include a non-transitory computer readable medium to store program code for retrieval by PHY controller 332, search engine circuit 336, measurement engine circuit 338, and other processors of PHY subsystem 330.

PHY controller 332 may be implemented as a processor configured to execute physical layer control software and control the various components of PHY subsystem 330 under the direction of the control logic defined therein in order to provide the requisite physical layer functionality to terminal device 104. In particular, PHY controller 332 may be configured to control measurement engine 338 to perform cell search and measurement procedures.

Baseband modem 226 may additionally include protocol stack subsystem 340, which may be responsible for the Layer 2 and Layer 3 functionality of the protocol stack. In an LTE context, protocol stack subsystem 340 may be responsible for Medium Access Control ("MAC"), Radio Link Control ("RLC"), Packet Data Convergence Protocol ("PDCP"), Radio Resource Control ("RRC"), Non-Access Stratum ("NAS"), and Internet Protocol ("IP") entity processes. Protocol stack subsystem 340 may be implemented as a processor configured to execute protocol stack software and control mobile communication operations of terminal device 104 under the direction of control logic defined therein. Protocol stack subsystem 340 may interact with PHY subsystem 330, such as via an interface with PHY controller 332, to request physical layer services as specified by the protocol stack control logic including physical layer configuration and radio measurement. Protocol stack subsystem 340 may supply PHY subsystem 330 with downlink transport channel data (MAC data) scheduled for subsequent physical layer processing and transmission by PHY subsystem 330 (via RF transceiver 224 and antenna system 222). PHY subsystem 330 may conversely receive uplink physical channel data via (via RF transceiver 224 and antenna system 222) and perform subsequent physical layer processing on the received uplink physical channel data before providing the uplink physical channel data to protocol stack subsystem 340 as uplink transport channel data (MAC data). Subsequent reference to transmission and reception of signals by terminal device 104 may thus be understood as an interaction between antenna system 222, RF transceiver 224, and baseband modem 226 (PHY subsystem 330 and protocol stack subsystem 340) as thus detailed. Baseband modem 226 may additionally interface with application processor 228.

In at least one aspect, application processor 228 may be implemented as a Central Processing Unit ("CPU") and configured to execute various applications and/or programs of terminal device 104, such as, e.g., applications corresponding to program code stored in a memory component of terminal device 104 (not explicitly shown in FIG. 2). Application processor 228 may be configured to run an operating system ("OS") of terminal device 104, and may utilize the interface with baseband modem 226 in order to transmit and receive user data such as voice, video, application data, basic Internet/web access data, etc. Application processor 228 may also be configured to control one or more further components of terminal device 104, such as user input/output devices (display(s), keypad(s), touchscreen(s), speaker(s), external button(s), camera(s), microphone(s), etc.), peripheral devices, memory, power supply, external device interfaces, etc. Although depicted separately in FIG. 2, part or all of the detailed functionality of baseband modem 226 may be implemented at application processor 228, such as by executing the functionality of baseband modem 226 as software executed by the processor core of application processor 108 (e.g. in particular physical layer subsystem 330 and protocol stack subsystem 340). Such is recognized as providing equivalent functionality and the disclosure is thus not limited to either architecture.

Terminal device 104 may transmit and receive data with various network cells, according to the protocol stack and physical layer operations directed by physical layer subsystem 330 and protocol stack subsystem 340. As previously noted, PHY controller 332 may be configured to control measurement engine 338 to perform cell measurement procedures including those related to channel quality.

Figure 4:
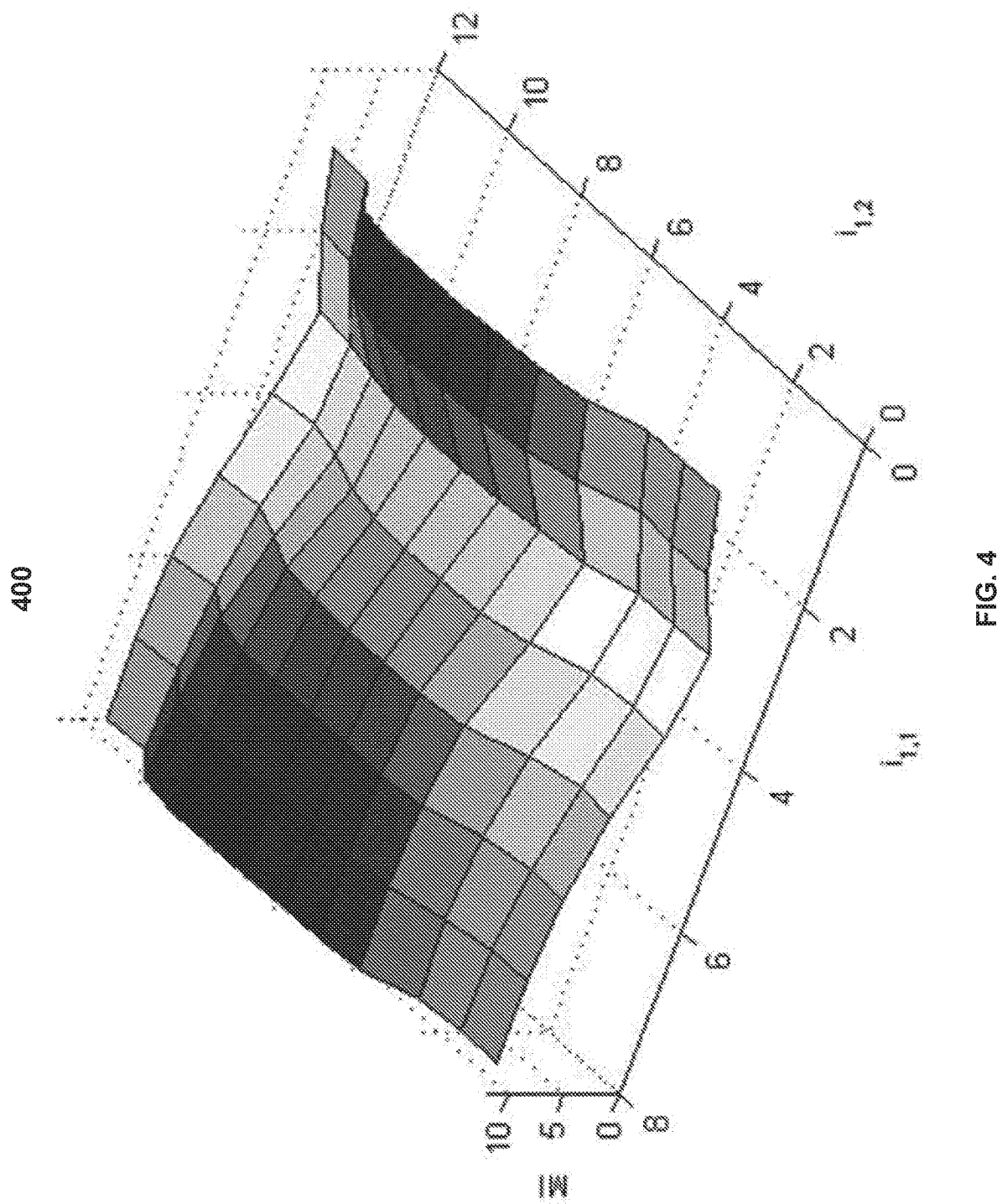
FIG. 4 shows an exemplary trend of channel quality metric variations in a three-dimensional beamforming system.

FIG. 4 shows an exemplary trend of channel quality metric variations in a three-dimensional beamforming system. More specifically, a surface graph 400 depicted therein illustrates a snapshot of the mutual information (MI) variation with respect to two orthogonal dimensions of a beam space of an exemplary LTE FD-MIMO Class A configuration. In FIG. 4, $i_{1,1}$ and $i_{1,2}$ represent two beam indexes corresponding to two orthogonal dimensions configured by the network. As FIG. 4 suggests, channel quality metric values can exhibit a degree of correlation over the beam space as the beam resolution becomes finer and the number of antenna elements increases.

A first implementation of the disclosure relates to an efficient beam search operation at a receiver of a beamforming system. In at least one aspect, the beamforming system of the first implementation may be the three-dimensional beamforming system 100 of FIG. 1, which includes the terminal device 104 as the receiver. As previously noted, however, those skilled in the art would recognize the disclosure is not limited thereto.

In an abridged overview of an operation of the first implementation, terminal device 104 may utilize a channel quality metric that is more computationally efficient for each individually tested beam candidate than other metrics, such as MI, in estimating a preferred beam direction for CSI feedback. Such channel quality metrics may include channel power and/or proximity to a unitary basis matrix of the channel. While these metrics may involve less computation than MI, which is better suited with respect to capacity, they do not necessarily correspond to reception performance. The approach of employing suboptimal metrics—while certainly useful—does not address the fundamental dependency of the computation load being based on the number of candidate beams. While the channel quality metrics of the first implementation may reduce the computation for each tested beam candidate, these channel quality metrics may be characterized as being less accurate than other metrics.

The first implementation of the disclosure may be combined with the following class of beam search methods for devices in three-dimensional beamforming systems. In some aspects, the number of beam candidates may be reduced via coarse-to-fine subsampling of beam indices utilizing one or more aspects of the beam search techniques described herein. For instance, a multi-step subsampling and gradual localization of a beam space may be characterized as a branch-and-bound decision process. The branch-and-bound decision process may, in some aspects, include heuristics in conjunctions with the implementations discussed herein.

Figure 5:
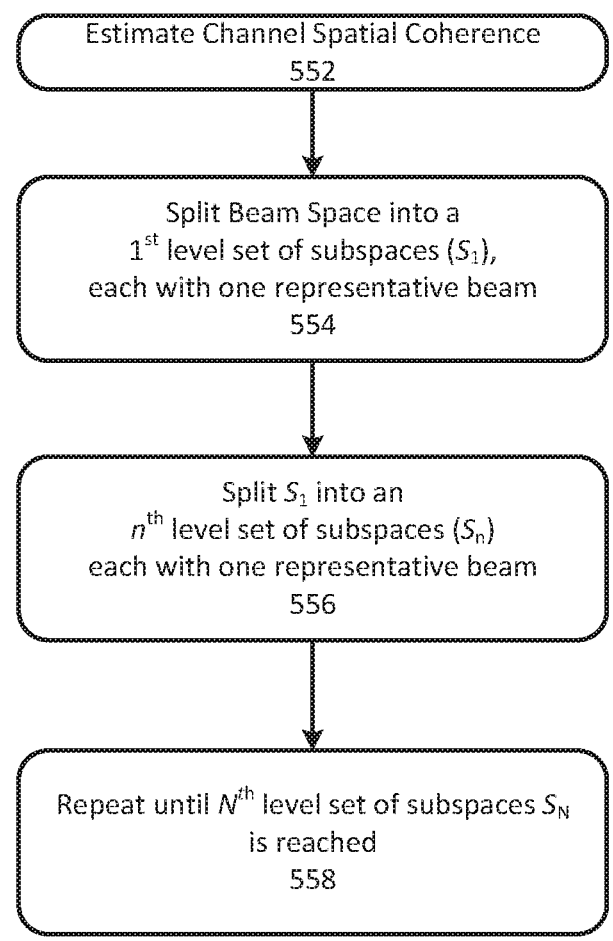
FIG. 5 shows a flow diagram for a second implementation of the disclosure.

FIG. 5 shows a flow diagram for a second implementation of the disclosure. In particular, the second implementation of the disclosure relates to a branching operation 550, which may be executed at a receiver of a three-dimensional beamforming system.

At 552, the receiver, such as terminal device 104, may be configured to estimate a channel spatial coherence of the beam space $\Omega$ using one of various methodologies. The channel spatial coherence is a correlation in a channel quality metric between two candidate beams. This correlation may provide a measure of the relationship between signals received by two antennas fed by the same source situated at different points in space.

In some aspects, this correlation may be a modeled as a function of signal conditions, such as the angle of arrival, the power azimuth spectrum (PAS), antenna spacing and the system bandwidth. For instance, when the signals received by two sequential elements of the receiving antenna array fed by a transmitting antenna are denoted as $V_{n_r}$ and $V_{n_r+1}$, the coefficient of the spatial correlation between them may be defined as follows:

$$r(d) = \frac{E\{V_{n_r}^*(d, \theta)V_{n_r+1}(d, \theta)\} - E\{V_{n_r}^*(d, \theta)\}E\{V_{n_r+1}(d, \theta)\}}{\prod_{i=n_r}^{n_r+1} \sqrt{\langle V_i^* V_i \rangle - \langle V_i^* \rangle \langle V_i \rangle}}, (n_r = 1, 2, \ldots, N_r) \quad \text{Equation (1)}$$

where $N_r$ represents the number of receiving antennas, d represents the distance between antennas, $\theta$ represents the angle of arrival and $E\{.\}$ represents an average value function and * denotes the complex conjugate.

In the context of three-dimensional beamforming systems having a narrower beamwidth (i.e., finer granularity) and higher antenna correlation, a pair of beams may exhibit a higher spatial coherence. In some aspects, an estimate of the channel spatial coherence may be used to determine parameters of both the branching and bounding procedure described herein. For instance, the resolutions of a $1^{st}$ level split and a final level split in branching and/or the number of survivors at each level in bounding may be derived from an estimated channel spatial coherence.

In at least one aspect, the receiver may utilize a parametric approach. Parametric approaches generate a MIMO channel matrix based on a geometric description of the propagation environment (e.g., ray-tracing techniques). In other aspects, the receiver may utilize a non-parametric approach based on a given model (e.g., the Kronecker model).

In some aspects, the spatial coherence of the beam space $\Omega$ may be characterized by one or more parameters, such as a "hill." A hill may be referred to as a distinct local region of the beam space $\Omega$ that includes a group of adjacent beams. Each of the beams of this distinct local region may have relatively higher channel quality values associated therewith. A beam that achieves the highest MCS within a distinct local rejection may thus be referred to as a channel quality "peak" herein, in each hill.

In at least one aspect, the spatial coherence of the beam space $\Omega$ may be characterized by three parameters: (i) the average size of channel quality hills; (ii) the average number of distinct hills; and (iii) the average size of groups of adjacent beams in a hill, whose channel quality metric values lead to the same MCS as that of the peak of the hill. The set of these three parameters depends on the configuration of the beamforming system and the actual channel quality metric employed.

In some aspects, these parameters may be deduced from empirical observations at a receiver. Likewise, its parametric relationship with channel correlations may be established by modeling them as functions of an average pair-wise correlation of the selected channel quality metrics or, for an even simpler model, as functions of transmitter and receiver antenna correlations.

In at least one aspect, the hills whose peak metric values correspond to a similar MCS as that of the global optimum may be considered of interest. For instance, the first and the third parameters may be used to determine the resolutions of the $1^{st}$ level split and/or the final level split, respectively, while the second parameter may be used as an upper bound on the number of survivors at each level.

In some aspects, the channel spatial coherence may be estimated based on the non-precoded reference signals from the transmitter. For instance, the terminal device 104 may be configured to receive a plurality of non-precoded reference signals at antenna system 222. The terminal device 104 may be further configured to compute a variety of channel quality metrics from the non-precoded reference signals received therein. These channel quality metrics may be determined based on an instantaneous channel realization, a time-averaged channel realization, and/or updates thereof, which may be determined locally. Additionally or alternatively, one or more channel quality metrics may be forwarded by another device, such as over a D2D link to the terminal device 104 when they are within a predetermined proximity of each other. In at least one aspect, the terminal device 104 may be configured to estimate the channel spatial coherence of the beam space $\Omega$ based on angle of arrival information, the power PAS, receiver antenna spacing and/or system bandwidth.

While various methodologies are described to estimate channel spatial coherence, other parametric and non-parametric approaches may be utilized. For instance, other estimates based on a minimum expected spatial coherence, the Kronecker model, the Weichselberger model, majorization, a uniform linear array, a uniform circular array, etc. may be employed at the terminal device 104 depending upon the design of a particular beamforming system.

At 554-558, the branching procedure may execute in terminal device 104 to recursively construct or define N sets of subspaces of the beam space $\Omega$, one set per level, so that there is a set $S_n$ of subspaces for the $n^{th}$ level, where $n \in \{1, \ldots, N\}$, $N \geq 2$. The elements of $S_n$ are referred to herein as $n^{th}$ level subspaces. Thus for a subspace $S \in S_n$, we have $S \subseteq \Omega$.

Branching may be performed by the terminal device 104 via a fixed construction or adaptive construction of $S_n$. In a fixed construction of $S_n$, branching may be performed only once and independent of an instantaneous channel realization. For instance, branching may be based on a minimum expected spatial coherence for a given beamforming system, which is in some aspects may be determined by, or read from a memory of the terminal device 104. Alternatively, $S_n$ may be constructed by the terminal device 104 in adaptive manner, such as based on one or more time-varying spatial coherence estimates.

At 554, the branching procedure may split the beam space $\Omega$ into a plurality of subspaces to construct $S_1$. In some aspects, $S_1$ may recursively split into sets of smaller and smaller subspaces resulting in $S_n$ at 556, until in the $N^{th}$ iteration $S_N$ is reached at 558. Each iteration of the splitting and the resultant subspaces are associated with a level $n \in \{1, \ldots, N\}$. As described herein, the first split yields a set of $1^{st}$ level subspaces, whereas the second split yields a set of $2^{nd}$ level subspaces, and so on. An $n^{th}$ level subspace may or may not overlap with another $n^{th}$ level subspace. Regardless, the union of all $n^{th}$ level subspaces is equal to the beam space $\Omega$: $\cup_{S \in S_n} S = \Omega$.

The size of the subspaces may be determined by parameters of the branching procedure. In some aspects, the size of $1^{st}$ level subspace and the size of a $N^{th}$ level subspace may be determined by the first and the third parameters of the branching procedure, respectively. Stated differently, the resolution of $1^{st}$ level split and the resolution of the final level split may be determined by design parameters of the branching procedure.

In at least one aspect, the size of $1^{st}$ level subspace at 554 reflects a macroscopic trend of channel quality variation over the beam space $\Omega$. For instance, the $1^{st}$ level split may employ the coarsest resolution that can still identify distinct local regions (i.e., groups of adjacent beams) of relatively higher channel quality values, i.e., hills.

In some aspects, the $N^{th}$ level subspace size at 558 reflects a microscopic trend of channel quality variation over the beam space $\Omega$. By way of example, the final level split may employ the coarsest resolution that can still identify a beam that achieves the highest MCS, i.e., the channel quality peak in each hill.

In the final level, the identified beam does not have to be the true peak with the highest channel quality metric value. Rather, it is sufficient to have the identified beam as a beam whose associated channel quality metric value leads to the same MCS as that of the true peak.

The number of branching iterations, or levels, can be derived by the terminal device 104 from two of the resolutions and the beam space $\Omega$. For example, each subspace $S \in S_n$ for $n < N$ is associated with a non-empty set $F_{n+1}(S) \subseteq S_{n+1}$ of subspaces that will be considered when S is not pruned. In the case the sets $S_n$ are constructed such that their subspaces are mutually disjoint ("non-overlapping"), then two different (and thus disjoint) subspaces S and $S' \in S_n$ imply disjoint F(S) and $F_{n+1}(S')$ as well.

Figure 6A:
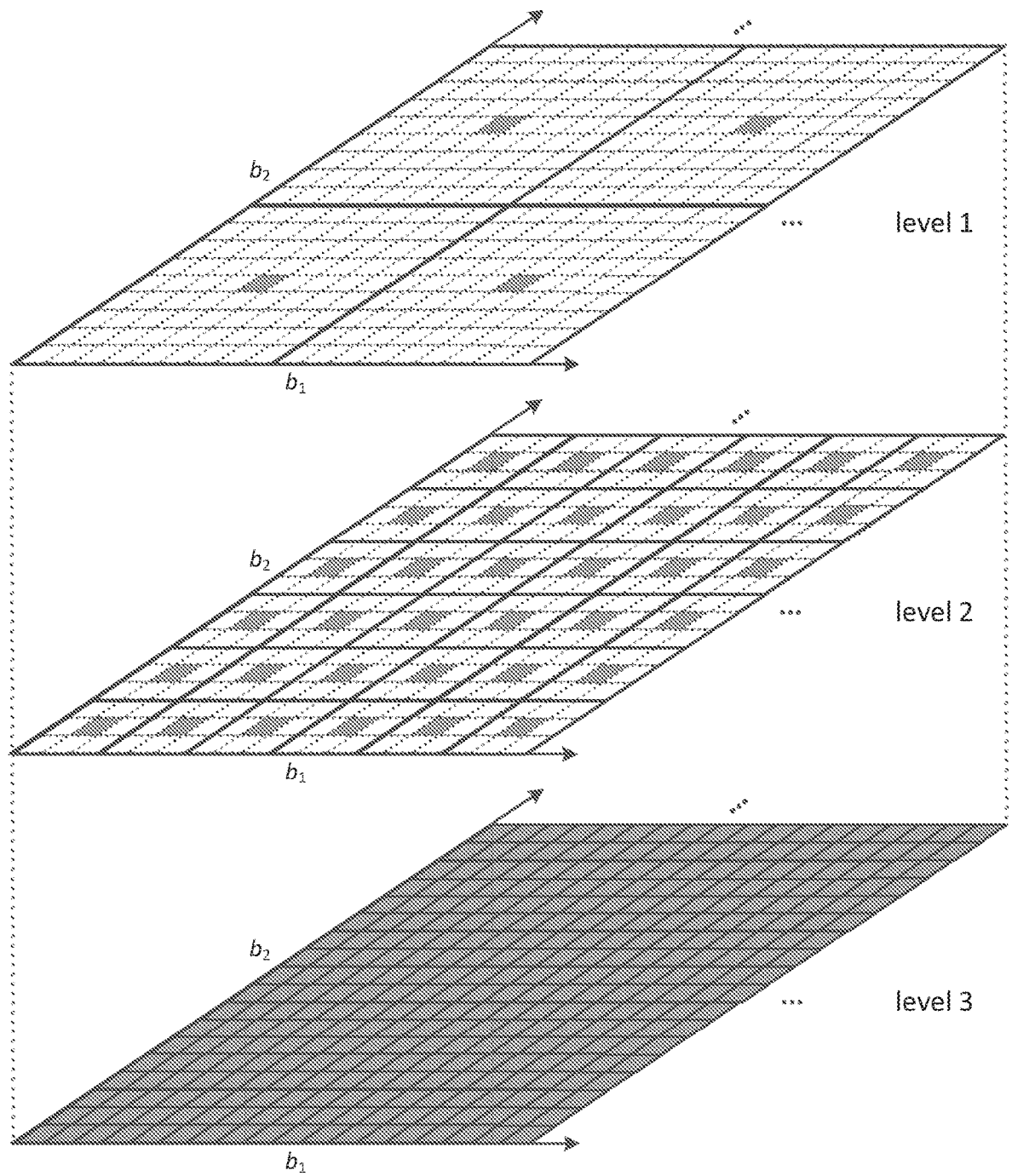
FIG. 6A shows a branching operation according to a third implementation of the disclosure.
Figure 6B:
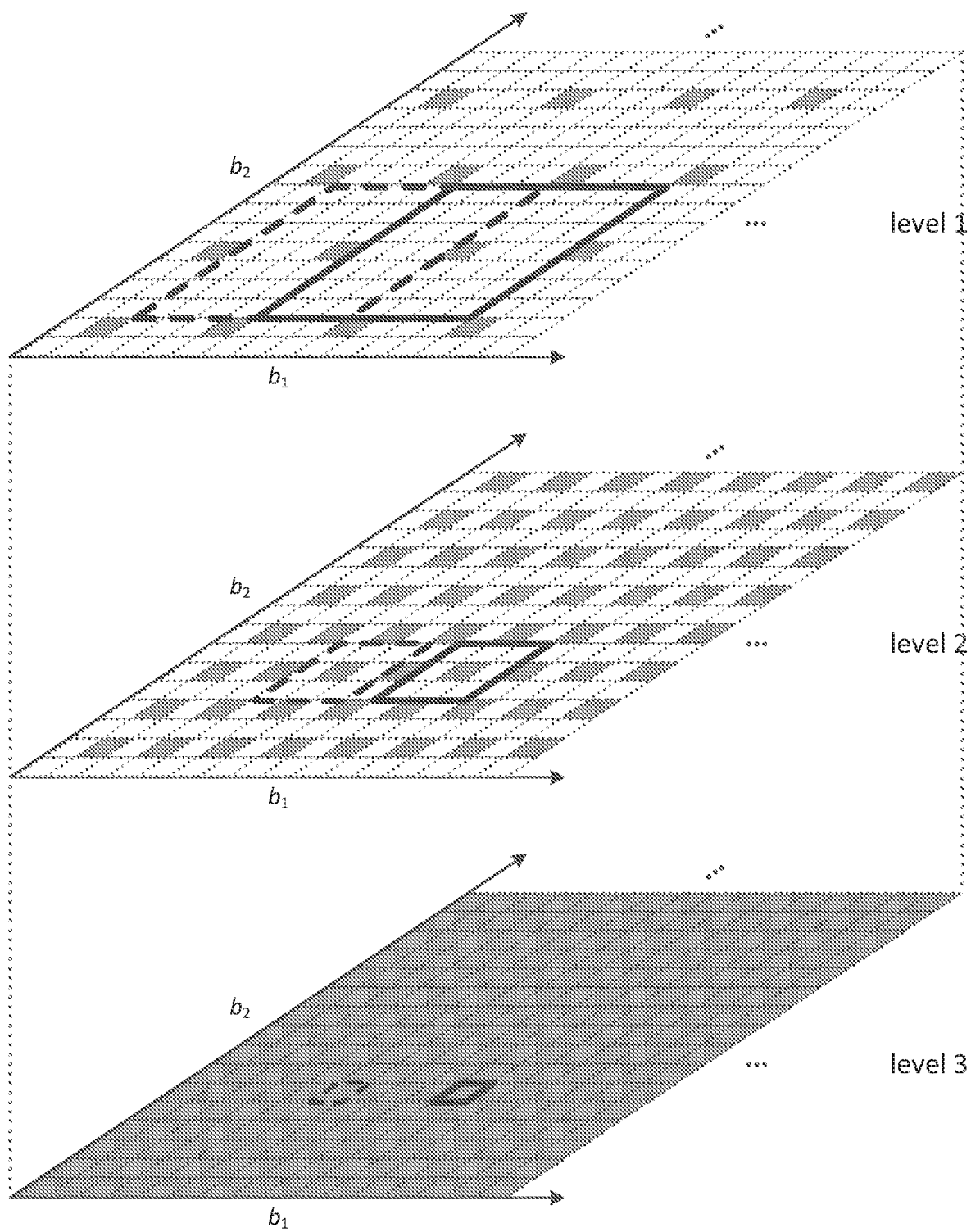
FIG. 6B shows a branching operation according to a fourth implementation of the disclosure.

FIGS. 6A-6B respectively show branching procedures according to third and fourth implementations of the disclosure.

FIG. 6A shows a branching procedure according to a third implementation of the disclosure. In particular, FIG. 6A relates to a branching procedure having non-overlapping subspaces of the beam space $\Omega$. More specifically, the illustrated branching procedure is a 3-level branching procedure producing $1^{st}$ level non-overlapping subspaces, $2^{nd}$ level non-overlapping subspaces, and $3^{rd}$ level non-overlapping subspaces of a beam space $\Omega$.

The indices $b_1$ and $b_2$ correspond to two orthogonal dimensions of the beam space $\Omega$. A candidate beam may be uniquely identified as a distinct $(b_1, b_2) \in \Omega$ and is represented by a dotted-line rectangle. A thick-solid rectangle represents a subspace comprising a dark-shaded beam as the representative beam of the subspace (i.e., node of the 3D tree). As seen in the $1^{st}$ and $2^{nd}$ levels, each subspace may further comprise at least one candidate beam. By way of comparison to FIG. 6B, it should be noted that each of the subspaces are shown in FIG. 6A.

FIG. 6B shows a branching procedure according to a fourth implementation of the disclosure. In particular, FIG. 6B relates to a branching procedure having two overlapping $1^{st}$ level subspaces of the beam space $\Omega$. The illustrated branching procedure is a 3-level branching procedure producing $1^{st}$ level overlapping subspaces, $2^{nd}$ level overlapping subspaces, and $3^{rd}$ level non-overlapping subspaces of a beam space $\Omega$.

As previously noted, the indices $b_1$ and $b_2$ correspond to two orthogonal dimensions of the beam space $\Omega$. A candidate beam may be uniquely identified as a distinct $(b_1, b_2) \in \Omega$ and is represented by a dotted-line rectangle. A thick-solid rectangle represents a first subspace whereas a thick-dashed line represents a second subspace in each level. Each of the first and second subspaces comprise a dark-shaded beam that is the representative beam of the subspace. As seen in the $1^{st}$ and $2^{nd}$ levels, each of the first and second subspaces may further comprise at least one candidate beam. By way of comparison to FIG. 6A, it should be noted that only two subspaces per level are shown in FIG. 6B to better illustrate the relationship between subspaces and how the size of the subspaces shrinks as branching level increases.

The number of levels of branching, subspaces of each level, beams within a subspace, and/or number of levels having overlapping subspaces depicted in FIGS. 6A-6B is purely illustrative in nature. Although the subspaces have been classified as either being overlapping or non-overlapping in each level, it further contemplated by the disclosure that some subspaces of an $n^{th}$ level may overlap, whereas other subspaces may not. In FIG. 6B, for instance, the first and second subspaces of the $2^{nd}$ level are non-overlapping. It further should be noted that while the $3^{rd}$ level or $N^{th}$ level subspaces illustrated in FIGS. 6A-6B include one representative beam, this is not always the case. A subspace of the final level may include other beams in addition to the representative beam depending upon, for instance, the degree of channel spatial coherence. Stated differently, the granularity of the final level subspaces may vary with the channel spatial coherence.

Figure 7:
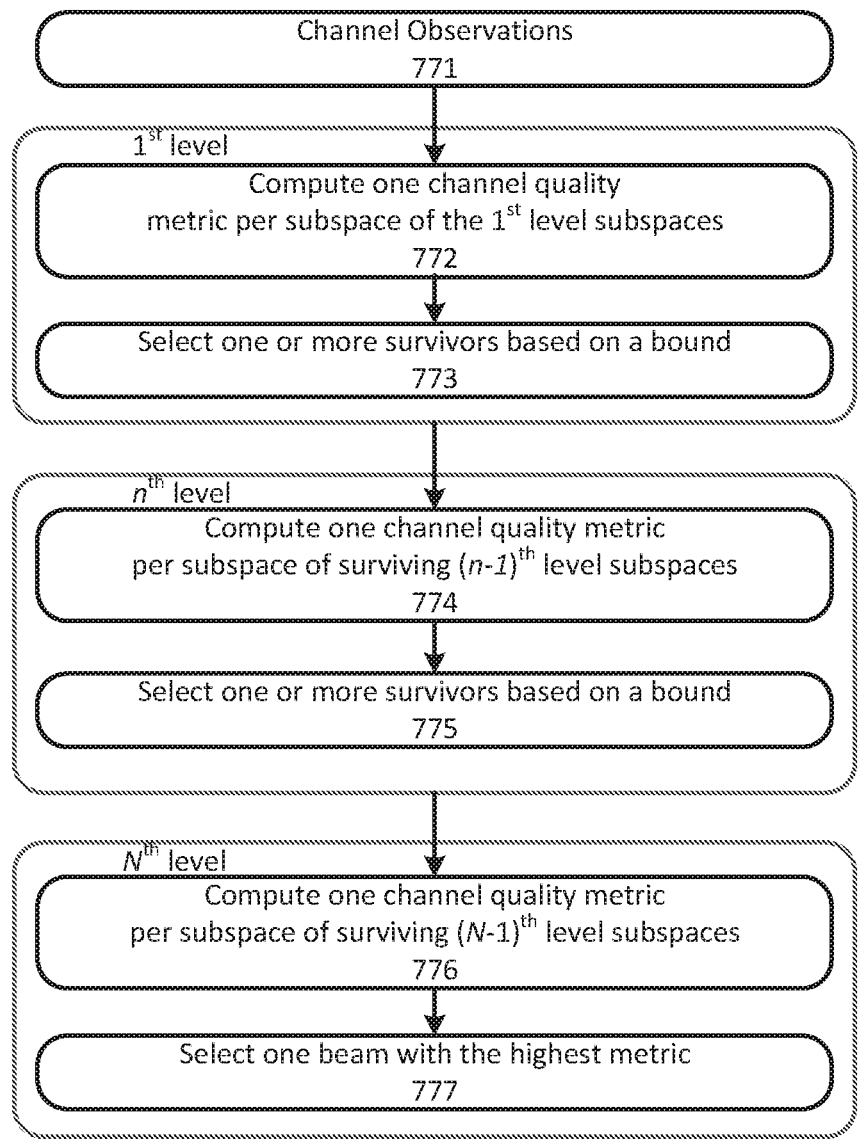
FIG. 7 shows a flow diagram for a fifth implementation of the disclosure.

FIG. 7 shows a flow diagram for a fifth implementation of the disclosure. In particular, the fifth implementation of the disclosure relates to a bounding procedure 770, which may be executed at a receiver of a three-dimensional beamforming system. Bounding procedure 770 may be viewed herein as a search spanning N levels, which may be utilized to reduce the number of candidate beams tested. This search may comprise an M number of stages, where $m \in \{1, \ldots, M\}$. In some aspects, the bounding procedure 770 may remove (i.e., prune) subspaces whose representative channel quality metric value is "out of bounds" (e.g., below a certain bound) for a respective level and/or stage.

The bounding procedure 770 of FIG. 7 is implemented as a breadth-first search of a tree structure. Breadth-first searches may consider all surviving nodes of a given level before moving on to the next level. Surviving nodes may be referred herein as "survivors," which, at level n, are subspaces $S \in S_n$.

At 771, the terminal device 104 may perform a channel observation procedure. For instance, the terminal device 104 may be configured to receive and measure a plurality of non-precoded reference signals at antenna system 222. These channel observations may be based on an instantaneous channel realization, a time-averaged channel realization, and/or updates thereof, which may be determined locally. Additionally or alternatively, one or more channel observations may be forwarded by another device, such as over a D2D link to the terminal device 104 when they are within a predetermined proximity of each other.

At 772, the terminal device 104 may be configured to compute a channel quality metric from the non-precoded reference signals for each of the subspaces of the $1^{st}$ level and/or stage. One or more of these channel quality metrics may be computed and/or determined from the channel observations described in 771.

At 773, the terminal device 104 may be configured to select at least one survivor subspace based on a bound for the $1^{st}$ level subspace and/or $1^{st}$ stage.

At 774, the terminal device 104 may be configured to determine a channel quality metric from the non-precoded reference signals for each of the subspaces of the $n^{th}$ level and/or $m^{th}$ stage. One or more of these channel quality metrics may be computed and/or determined from the channel observations described in 771.

At 775, the terminal device 104 may be configured to select at least one survivors based on a bound for the $n^{th}$ level subspace and/or $m^{th}$ stage.

At 776, the terminal device 104 may be configured to determine a channel quality metric from the non-precoded reference signals for each of the subspaces of the $N^{th}$ level subspace and/or $M^{th}$ stage. One or more of the channel quality metrics may be computed and/or determined from the channel observations described in 771.

At 777, the terminal device 104 may be configured to select a beam with the highest channel quality metric of the $1^{st}$ level-$N^{th}$ level subspace and/or $1^{st}$-$M^{th}$ stage.

The bounding procedure 770 of FIG. 7 may be better understood by way of comparison to the branching procedure 550 of FIG. 5. By way of review, the branching procedure 550 may be viewed as generating a three-dimensional N-level tree structure of beam candidates. Bounding procedure 770 may be viewed as an M-stage search over the tree, where a stage is defined as the evaluation of the subspaces in $F_{n+1}(S)$ for a $S \in S_n$.

Although the bounding procedure 770 of FIG. 7 is implemented as a breadth-first bounding procedure, it should be noted that other types of searches including best-first and depth-first searches are possible. Likewise, many graph search algorithms can be adapted in the bounding procedure, since the beam space $\Omega$ may be translated into a tree structure via the branching procedure 550.

The number of stages M may be pre-determined or variable. A variable M may depend on the bound, and/or a limit on maximum M can be imposed by a variety of early stopping schemes. In some aspects, early stopping rules can be enforced for shorter searches, via a threshold on the current maximum metric, a threshold on the difference between the current maximum and other values, a fixed number of steps, etc.

The bound itself, in addition, may be pre-determined or adaptive. An adaptive bound, for instance, may be updated with a new set of channel observations or updated at each stage of bounding. The bound may be referred to herein as a threshold channel quality metric. In some aspects, the threshold channel quality metric may be defined with respect to a particular level of the subspaces. For instance, a channel quality metric value that is representative of a candidate subspace may be compared to a threshold channel quality metric of a particular level of the subspaces. Additionally or alternatively, the threshold channel quality metric may be defined with respect to the particular stage of the bounding procedure 770. For example, the channel quality metric value that is representative of a candidate subspace may be compared to an adaptive threshold channel quality metric that is updated at each stage and/or is a fraction of the highest channel quality metric value found so far in the search.

Figure 8A:
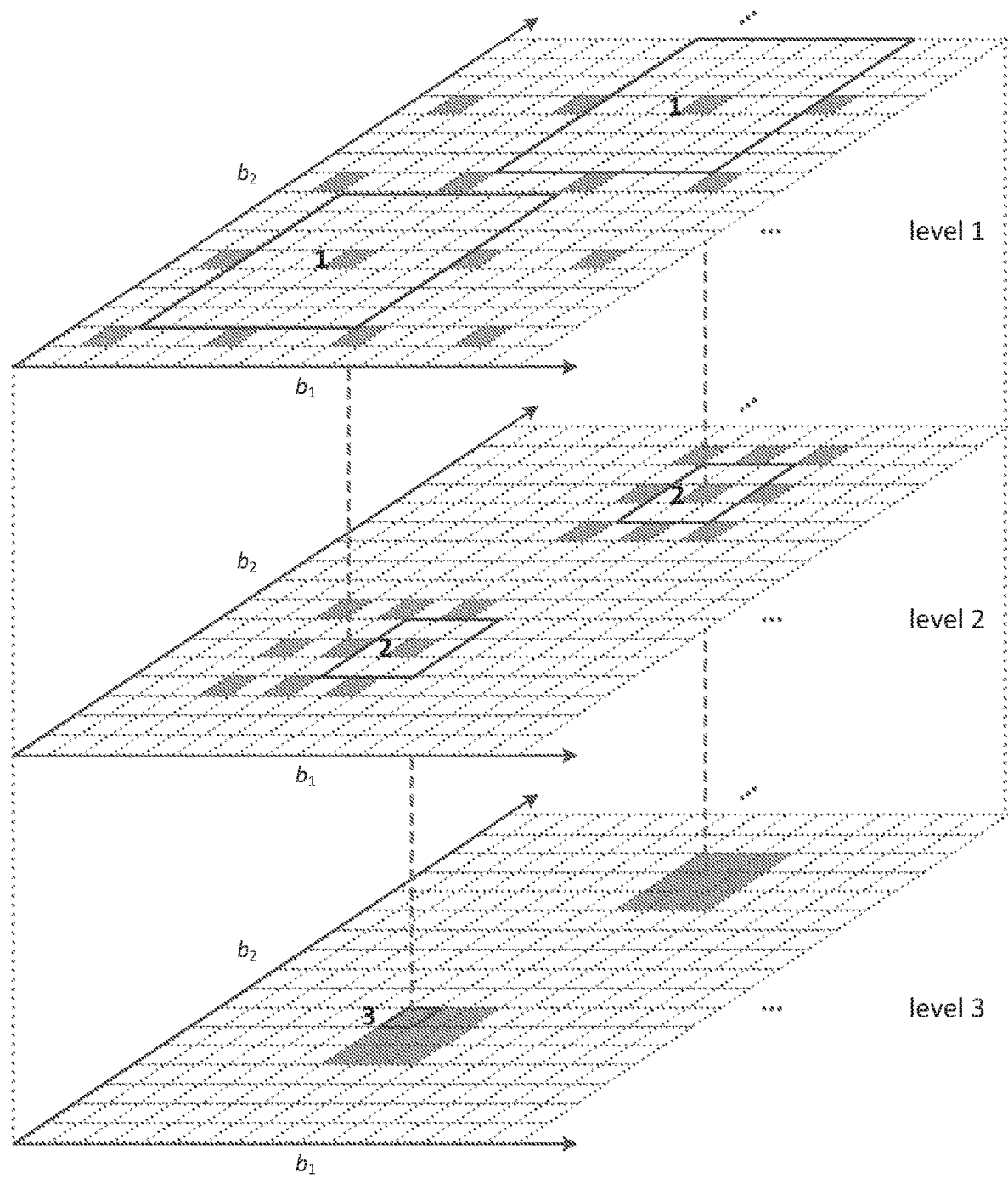
FIG. 8A shows a bounding procedure according to a sixth implementation of the disclosure.
Figure 8B:
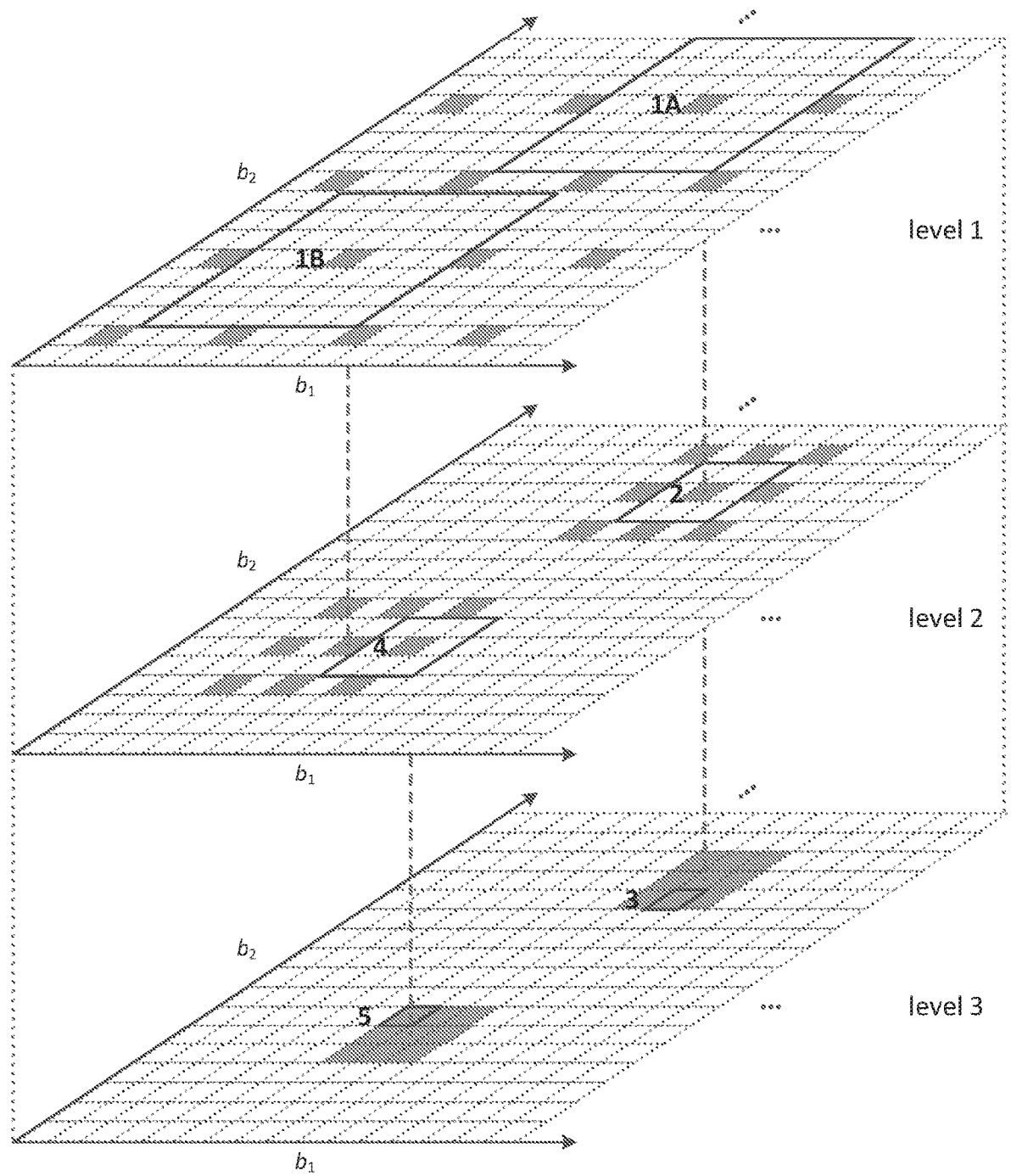
FIG. 8B shows a bounding procedure according to a seventh implementation of the disclosure.

FIGS. 8A-8B respectively show bounding procedures according to sixth and seventh implementations of the disclosure.

FIG. 8A shows a bounding procedure according to a sixth implementation of the disclosure. In particular, FIG. 8A relates to a breadth-first bounding procedure, which may be executed in a receiver (e.g., terminal device 104) of a three-dimensional beamforming system. More specifically, the bounding procedure illustrated therein spans the 3-level three-dimensional tree with overlapping subspaces. In this case, the two subspaces outlined in bold for each level do not overlap with each other.

By way of review, the indices $b_1$ and $b_2$ correspond to two orthogonal dimensions of the beam space $\Omega$. A candidate beam may be uniquely identified as a distinct $(b_1, b_2) \in \Omega$ and is represented by a dotted-line rectangle. A thick-solid rectangle represents a subspace comprising a dark-shaded beam as the representative beam of the subspace. As seen in the $1^{st}$ and $2^{nd}$ levels, each subspace may further comprise at least one candidate beam. It should be noted that any two nodes with the same number indicators may be considered in any order.

In a breadth-first approach, all subspaces in each level may be considered by the terminal device 104 before moving onto the next level. That is, the channel quality metrics $m(S_1)$ of all level 1 subspaces $S_1 \in S$ are computed. Then, a lower bound $\kappa \cdot \max(m(S_1))$, $0 < \kappa < 1$, may be used to prune the level 1 subspaces, two of which survive in this example. Each survivor maps to nine level 2 subspaces $S_2 \in F_2(S_1)$, thus 18 channel quality metrics $m(S_2)$ are computed in the next stage.

When a $S_2$ node is the same as that of the parent $S_1$, then those channel quality metrics $m(S_2|S_1) = m(S_1)$ can be recycled via a memory of the terminal device 104. A lowerbound $\kappa \cdot \max(m(S_2))$ may be used to prune the level 2 subspaces, two of which survive in the example. Each level 2 survivors map to nine level 3 subspaces $S_3 \in F_3(S_2)$, thus 18 channel quality metrics $m(S_3)$ are computed, by the terminal device 104, in the next stage. Finally, since this is the final level, one subspace with the highest channel quality metrics $m(S_3)$ is selected by the terminal device 104, and its representative beam becomes the final selection.

FIG. 8B shows a bounding procedure according to a seventh implementation of the disclosure. In particular, FIG. 8B relates to a best-first bounding procedure, which may be executed in a receiver (e.g., terminal device 104) of a three-dimensional beamforming system. More specifically, the bounding procedure illustrated therein spans the 3-level three-dimensional tree with overlapping subspaces. Like FIG. 8A, the two subspaces outlined in bold for each level do not overlap with each other.

The three-dimensional tree of FIG. 8B is the same as that described in FIG. 8A. Thus, its description is omitted. It, however, should be noted that any two nodes with the same number indicators may be considered in any order.

In a best-first search, after the initial level 1 metric computations, the children subspaces of a parent subspace with higher channel quality metric value are considered by the terminal device 104 first, regardless of the level. The level 1 survivor $S_{1A}$, indicated by 1A, is associated with higher channel quality metrics $m(S_1)$ than the survivor $S_{1B}$. Thus, the level 2 subspaces of $S_{1A}$ are considered first. If $\max(m(S_2|S_{1A})) - m(S_{1B})$ is less than a certain threshold, $S_{1B}$ is kept in the queue of candidates to be considered. This process is repeated at level 3, after which the search backtracks to $S_{1B}$ and considers its children nodes, if channel quality metrics $m(S_{1B})$ is still within an interval defined by the current maximum and a threshold. When the final stage M is reached, where in this example M=5, one subspace with the highest channel quality metrics is selected by the terminal device 104, and its representative beam becomes the final selection.

FIGS. 9A-9B respectively show branching and bounding methods according to the eighth and ninth implementations of the disclosure.

FIG. 9A shows a branching and bounding method according to the eighth implementation of the disclosure. In method 990 for three-dimensional beamforming, the method comprises: estimating a channel spatial coherence for a beam space of a terminal device based on a plurality of non-precoded reference signals, the beam space comprising a plurality of beam subspaces based on the estimated channel spatial coherence, each of the beam subspaces including a beam direction that is representative of a respective beam subspace of the beam subspaces 992; and selecting, by the terminal device, a beam subspace of the beam subspaces based on a channel quality metric of the beam direction that is representative of the selected beam subspace 994.

FIG. 9B shows a branching and bounding method according to the ninth implementation of the disclosure. In method 995 for three-dimensional beamforming, the method comprises: estimating a channel spatial coherence for a beam space of a terminal device based on a plurality of non-precoded reference signals, the beam space comprising a plurality of beam subspaces based on the estimated channel spatial coherence, each of the beam subspaces including a beam direction that is representative of a respective beam subspace of the beam subspaces 996, selecting, by the terminal device, a beam subspace of the beam subspaces based on a channel quality metric of the beam direction that is representative of the selected beam subspace 997, and generating, by the terminal device, a feedback signal indicating the beam direction that is representative of the selected beam space 998.

Figure 10:
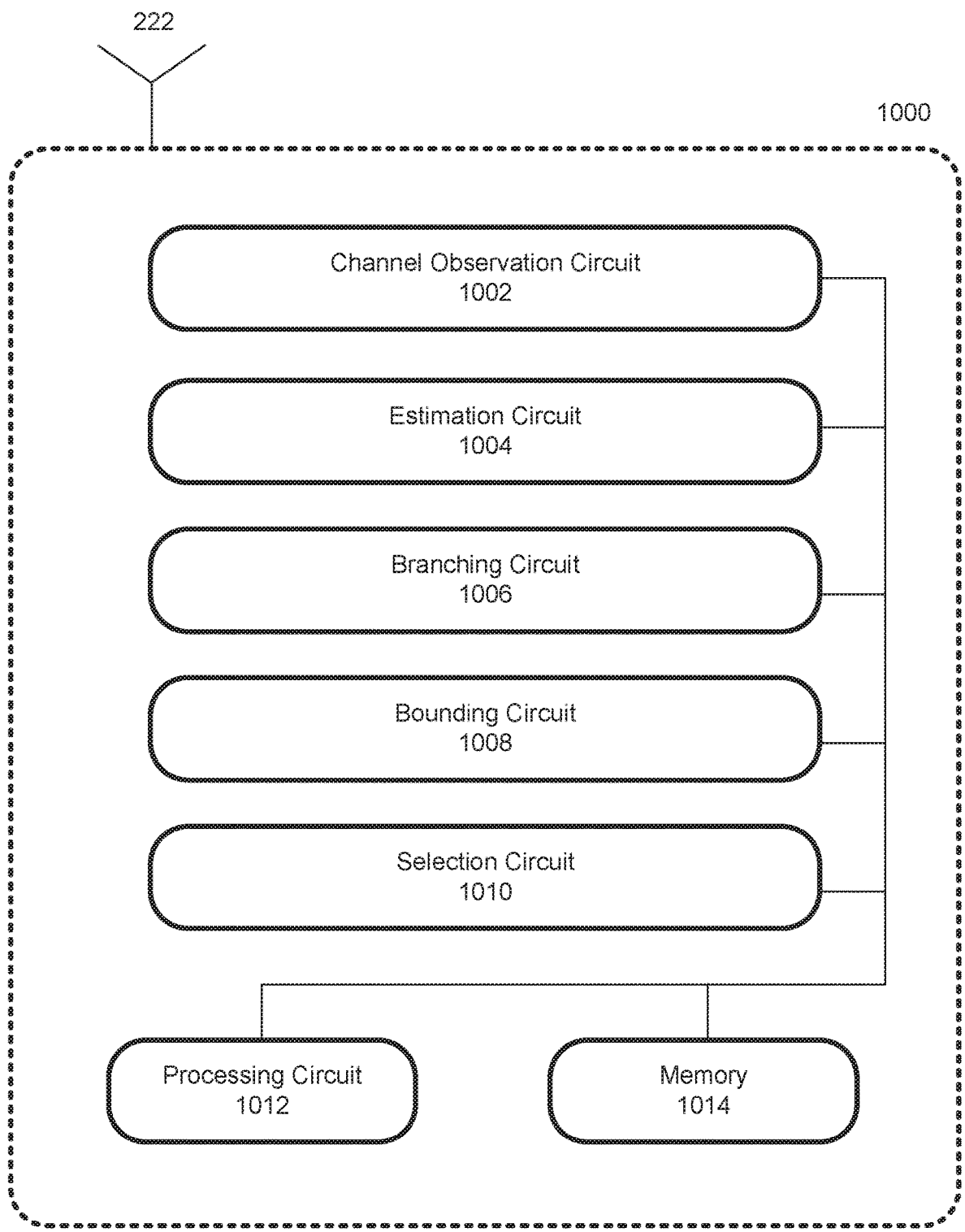
FIG. 10 shows a circuit configuration according to a tenth implementation of the disclosure.

FIG. 10 shows a circuit configuration 1000 according to a tenth implementation of the disclosure. The circuit configuration may be implemented within a receiver of a three-dimensional beamforming system. In accordance with some aspects, the circuit configuration may include a channel observation circuit 1002, an estimation circuit 1004, a branching circuit 1006, a bounding circuit 1008, a selection circuit 1010, a processing circuit 1012, and memory 1014. Although a particular circuit configuration is illustrated, the present disclosure is not limited to this illustrative example. For instance, circuit configuration 1000 may optionally include one or more elements or functions described with respect to terminal device 104.

The channel observation circuit 1002 may configured to receive the non-precoded reference signals at a plurality of receiver antennas of the terminal device. The estimation circuit 1004 may be configured to estimate a channel spatial coherence for a beam space of a terminal device based on a plurality of non-precoded reference signals. The branching circuit 1006 may be configured to define each of the beam subspaces to comprise a plurality of beam directions including the beam direction that is representative of the respective beam subspace, each of the beam directions having a channel quality metric associated therewith that is within a threshold range of the respective beam subspace. The bounding circuit 1008 may be configured to reduce a number of the beam subspaces that may be selected by the selection circuit based on a comparison of the channel quality metric of the beam direction that is representative of the identified beam subspace and a threshold channel quality metric of the beam subspaces. The selection circuit 1010 may be configured to select a beam subspace of the beam subspaces based on a channel quality metric of the beam direction that is representative of the selected beam subspace.

The processing circuit 1012 may be configured to generate a feedback signal indicating the beam direction that is representative of the selected beam space. Furthermore, one or more of the disclosed circuits 1002-1012 may be implemented by one or more the processors of the disclosure (e.g., application processor 228), whereas memory 1014 may be implemented by one or more the memory elements of the disclosure (e.g., buffer 334).

FIGS. 11-13 show a comparison of the throughput performance for an illustrative beamforming system and an exhaustive search. In particular, FIGS. 11-13 depict a comparison of the throughput performance of an LTE FD-MIMO Class A system achieved through (i) an exhaustive search of the beam space $\Omega$ and (ii) an illustrative implementation of the disclosure.

The LTE FD-MIMO Class A system is configured with bandwidth of 10 MHz, transmission mode 9, 16 Channel State Information-Reference Signal (CSI-RS) antenna ports, and 2 User Equipment (UE) Receive (Rx) antenna ports, $N_1=2$, $N_2=4$, $O_1=8$, $O_2=8$, Codebook Configuration 1, Reporting Mode 3-1, and Channel Quality Indicator (CQI) fixed to 14.

Figure 11A:
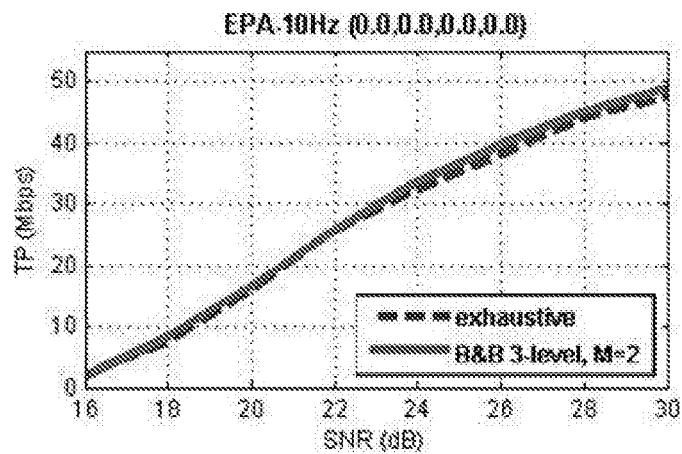
FIGS. 11A-11C show a first set of modeled comparisons of the throughput performance for an illustrative beamforming system of the disclosure and an exhaustive search.
Figure 11B:
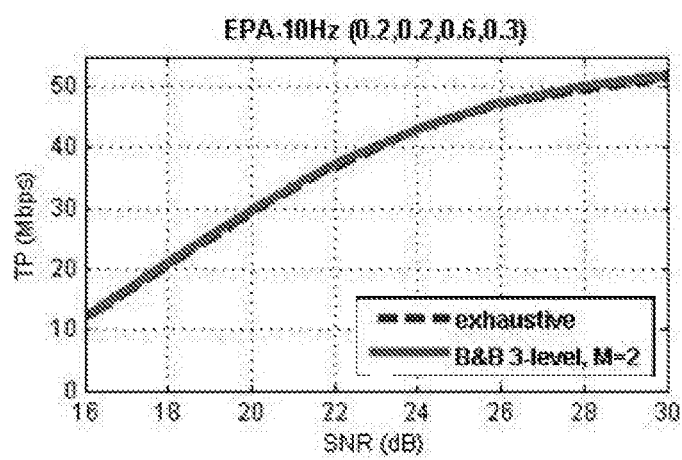
Figure 11C:
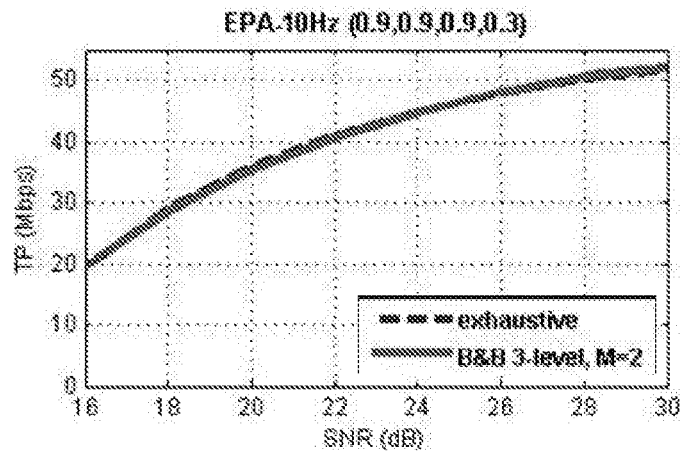
Figure 12A:
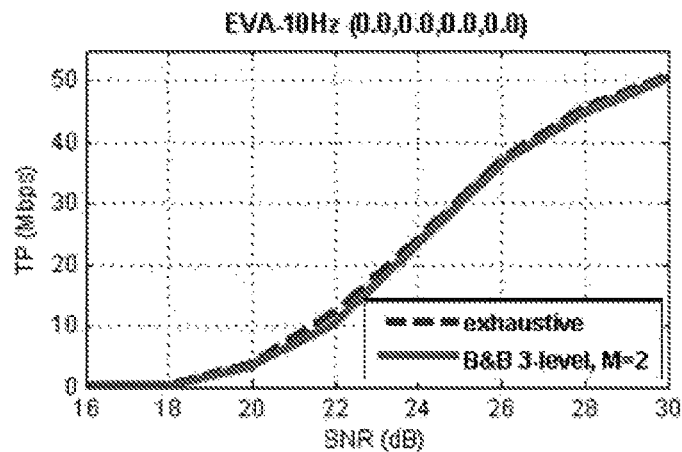
FIGS. 12A-12C show a second set of modeled comparisons of the throughput performance for an illustrative beamforming system of the disclosure and an exhaustive search.
Figure 12B:
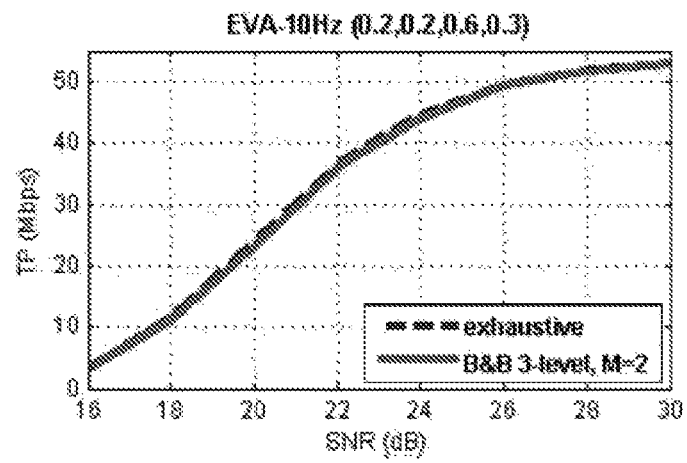
Figure 12C:
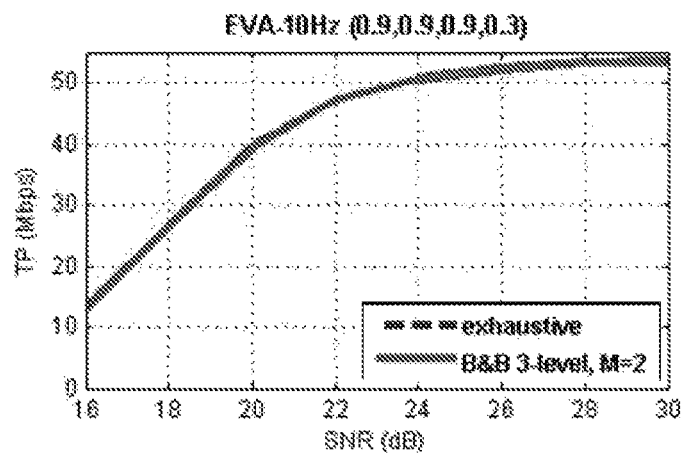

FIGS. 11-13 depict throughput (TP) performance in Megabits per second (Mbps) with respect to the signal-to-noise ratio (SNR) in decibels (dB) for a respective multipath fading propagation condition. FIGS. 11A-11C correspond to an Extended Pedestrian A (EPA) delay profile. FIGS. 12A-12C correspond to an Extended Vehicular A (EVA) delay profile. FIGS. 12A-12C correspond to an Extended Typical Urban (ETU) delay profile.

Figure 13A:
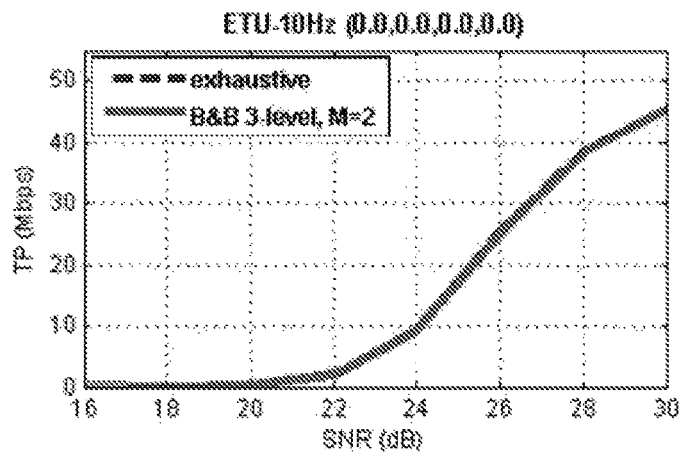
FIGS. 13A-13C show a third set of modeled comparisons of the throughput performance for an illustrative implementation of the disclosure and an exhaustive search.
Figure 13B:
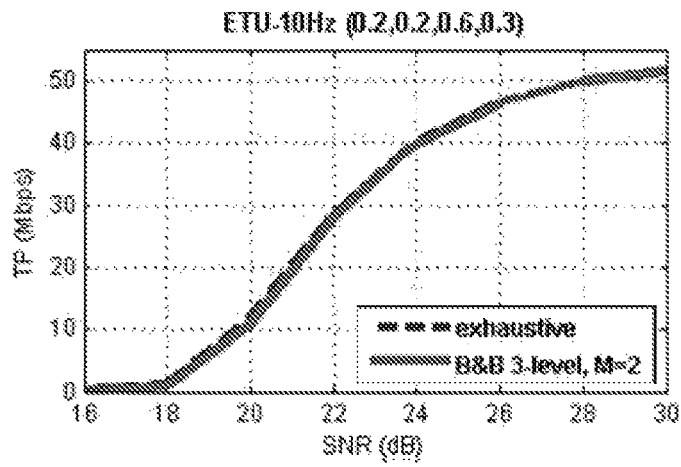
Figure 13C:
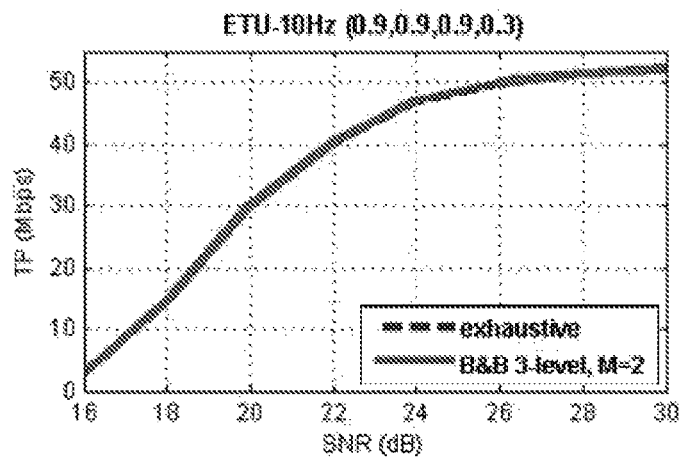

FIGS. 11-13 also depict TP performance in Mbps with respect to the SNR in dB for a respective correlation levels between transmit and receive antennas. FIGS. 11A, 12A, and 13A correspond to a low level of correlation having a MIMO channel correlation parameters of $(\alpha_1, \alpha_2, \beta, \gamma)=(0.0, 0.0, 0.0, 0.0)$, as defined in 3GPP Technical Specification 36.101. FIGS. 11B, 12B, and 13B correspond to a medium level of correlation having a MIMO channel correlation parameters of $(0.2, 0.2, 0.6, 0.3)$. FIGS. 11C, 12C, and 13C correspond to a high level of correlation having a MIMO channel correlation parameters of $(0.9, 0.9, 0.9, 0.3)$.

FIGS. 11-13 further depict a dashed curve representing the exhaustive search of the beam space $\Omega$ and a solid curve representing the second aspect of the disclosure. The exhaustive search of the beam space $\Omega$ considers all 512 beam candidates, whereas the particular implementation of the disclosure considers up to 59 beam candidates. More specifically, the illustrative implementation of the disclosure employs a branch-and-bound search method, in which the beam space $\Omega$ is translated into a 3-level tree structure. Candidate beams of the 3-level tree structure are pruned using a breadth-first bounding approach with 3 survivors at each level and stopping after the second stage (M=2) is employed. As FIGS. 11-13 suggest, this illustrative implementation of the disclosure can achieve near-full-search performance while reducing the number of beam candidates tested. Although an illustrative implementation of the disclosure is shown in FIGS. 11-13, it should be noted that other aspects of the disclosure and/or combinations thereof may achieve a reduction in the number of beam candidates, while maintaining a favorable search performance.

As previously noted, the first implementation of the disclosure employs channel quality metrics that reduces the computation for each of the tested hypotheses. The branch-and-bound beam search methods, however, may reduce the computational load at the receiver by directly reducing the number of tested beam hypotheses. In some aspects, the proposed subsampling approach may be used in conjunction with the approach detailed in the first implementation. Together, the receiver computation load can be reduced even further than what is achievable with only one of the methods.

In at least one aspect, the branch-and-bound beam search methods are described as heuristic branch-and-bound, in the sense that they do not always find the true optimum, but rather aim to reach an approximate solution that may or may not be a local or a global optimum. This potential suboptimality of the proposed methods arises because, in general, the globally optimum channel quality metric can only be found via an exhaustive search over the whole beam space. That is, strictly speaking, the set of per-beam channel quality metrics cannot always be characterized by a smaller set. For instance, a beamforming system may be designed such that the minimum expected spatial coherence is zero. This is different from approach of the first implementation whose suboptimality comes from the channel quality metric itself.

The suboptimality of the proposed methods, however, can be insignificant over a wide range of operation scenarios. This is because in practice, (i) a beam space tends to exhibit significant spatial coherence, and (ii) the impact of a difference in channel quality metric on the observable performance is de-sensitized due to a system constraint on the number of MCS levels. First, three-dimensional beamforming systems by intention support narrow beamwidth via a large number of antenna elements, whose form factor constraints translate to higher antenna correlation than in traditional communication systems. Second, the CSI corresponding to MCS can only be represented with a finite number of bits (e.g. 4 bits and 16 MCS levels in LTE), and thus a calculated estimate often achieves a similar link-adapted throughput performance as the optimum beam choice.

In view of the foregoing, the branch and bound implementations of the disclosure may be used to determine and provide CSI feedback by a receiver (e.g., terminal device 104) more efficiently than the first implementation of the disclosure. Together, however, the receiver computation load can be reduced even further than what is achievable with only one of the methods. As previously noted, an unrestricted beam space can span hundreds and even thousands of beam candidates in current and future-generation three-dimensional beamforming systems with non-precoded reference signals. In the branch and bound implementations, the number of tested beam candidates in a global codebook sweep may be reduced by an order of magnitude. Moreover, a reduction in associated hardware run-time, power consumption, and/or hardware size may be realized due to the reduction in number of beam candidates.

The following examples pertain to further aspects of this disclosure:

Example 1 is a method for three-dimensional beamforming, in which the method may include: estimating a channel spatial coherence for a beam space of a terminal device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; and selecting, by the terminal device, a beam subspace of the plurality of beam subspaces based on a channel quality metric of the beam direction that is representative of the beam subspace.

Example 2 is a method for three-dimensional beamforming, in which the method may include: estimating a channel spatial coherence for a beam space of a terminal device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; selecting, by the terminal device, a beam subspace of the plurality of beam subspaces based on a channel quality metric of the beam direction that is representative of the beam subspace; and generating, by the terminal device, a feedback signal indicating the beam direction that is representative of the selected beam space.

In Example 3, the subject matter of any one of Examples 1 or 2 may further include: receiving the plurality of non-precoded reference signals at a plurality of receiver antennas of the terminal device, wherein estimating the channel spatial coherence is based on a distance between the plurality of receiver antennas.

In Example 4, the subject matter of any one of Examples 1 to 3 can optionally include estimating the channel spatial coherence by: estimating the channel spatial coherence based on angle of arrival information of the plurality of non-precoded reference signals.

In Example 5, the subject matter of any one of Examples 1 to 4 may further include: updating the estimated channel spatial coherence based on changes in the plurality of non-precoded reference signals.

In Example 6, the subject matter of any one of Examples 1 or 2 can optionally include estimating the channel spatial coherence by: estimating the channel spatial coherence based on a minimum expected spatial coherence.

In Example 7, the subject matter of any one of Examples 1 to 6 may further include: defining the plurality of beam subspaces based on the estimated channel spatial coherence.

In Example 8, the subject matter of any one of Examples 1 to 7 can optionally include at least two of the plurality of beam subspaces being overlapping.

In Example 9, the subject matter of any one of Examples 1 to 7 can optionally include the plurality of beam subspaces being mutually disjoint.

In Example 10, the subject matter of any one of Examples 1 to 9 can optionally include the union of the plurality of beam subspaces being equal to the beam space.

In Example 11, the subject matter of any one of Examples 7 to 10 can optionally include defining the plurality of beam subspaces from the beam space by: defining each of the plurality of beam subspaces to comprise a plurality of beam directions representative of respective beam subspaces, wherein each of the plurality of beam directions is associated with a channel quality metric within a threshold range of the respective beam subspace.

In Example 12, the subject matter of Example 11 can optionally include the threshold range of the respective beam subspace being based on a difference from a mean of the channel quality metrics of the respective beam subspace, a difference from a median of the channel quality metrics of the respective beam subspace, a variance of the channel quality metrics of the respective beam subspace, or a standard deviation of the channel quality metrics of the respective beam subspace.

In Example 13, the subject matter of any one of Examples 7 to 12 can optionally include defining the plurality of beam subspaces from the beam space by: defining a plurality of $N^{th}$ level beam subspaces from each of the plurality of beam subspaces based on the estimated channel spatial coherence, each of the plurality of $N^{th}$ level beam subspaces including an $N^{th}$ level beam direction that is representative of a respective $N^{th}$ level subspace of the plurality of $N^{th}$ level beam subspaces.

In Example 14, the subject matter of Example 13 may further include: selecting, by the terminal device, an $N^{th}$ level beam subspace from the plurality of $N^{th}$ level beam subspaces based on a channel quality metric of the $N^{th}$ level beam direction that is representative of the $N^{th}$ level beam subspace.

In Example 15, the subject matter of any one of Examples 13 or 14 can optionally include each of the plurality of beam subspaces respectively corresponding to the plurality of $N^{th}$ level beam subspaces.

In Example 16, the subject matter of any one of Examples 13 to 15 can optionally include the union of the plurality of $N^{th}$ level beam subspaces being equal to the beam space.

In Example 17, the subject matter of any one of Examples 13 to 16 can optionally include defining the plurality of $N^{th}$ level beam subspaces from each of the plurality of beam subspaces by: defining each of the plurality of $N^{th}$ level beam subspaces to comprise at least one $N^{th}$ level beam direction representative of the respective $N^{th}$ level beam subspace, wherein each of the plurality of $N^{th}$ level beam directions is associated with a channel quality metric within a range of the respective $N^{th}$ level beam subspace.

In Example 18, the subject matter of Example 17 can optionally include the range of the respective $N^{th}$ level beam subspace being based on a difference from a mean of the channel quality metrics of the respective $N^{th}$ level beam subspace, a difference from a median of the channel quality metrics of the respective $N^{th}$ level beam subspace, a variance of the channel quality metrics of the respective $N^{th}$ level beam subspace, or a standard deviation of the channel quality metrics of the respective $N^{th}$ level beam subspace.

In Example 19, the subject matter of Examples 13 to 18 can optionally include defining the plurality of $N^{th}$ level beam subspaces from each of the plurality of beam subspace by: defining a plurality of N−1 level beam subspaces from each of the plurality of beam subspaces based on the estimated channel spatial coherence, each of the plurality of N−1 level beam subspaces including an N−1 level beam direction representative of a respective N−1 level beam subspace of the plurality of N−1 level beam subspaces, and defining a plurality of $N^{th}$ level beam subspaces from each of the plurality of N−1 level beam subspaces based on the estimated channel spatial coherence, each of the plurality of $N^{th}$ level beam subspaces including an $N^{th}$ level beam direction representative of a respective $N^{th}$ level beam subspace of the plurality of $N^{th}$ level beam subspaces.

In Example 20, the subject matter of any one of Examples 1 to 19 may further include: performing a bounding procedure on the plurality of beam subspaces that may be selected by the terminal device.

In Example 21, the subject matter of Example 20 can optionally include performing the bounding procedure in a predetermined number of stages.

In Example 22, the subject matter of Example 20 can optionally include performing the bounding procedure in a variable number of stages.

In Example 23, the subject matter of any one of Examples 20 to 22 can optionally include performing the bounding procedure by: identifying a beam subspace of the plurality of beam subspaces based on a channel quality metric of the beam direction that is representative of the identified beam subspace.

In Example 24, the subject matter of Example 23 can optionally include performing the bounding procedure by:

comparing the channel quality metric of the beam direction that is representative of the identified beam subspace and a threshold channel quality metric of the plurality of beam subspaces.

In Example 25, the subject matter of Example 24 can optionally include the threshold channel quality metric of the plurality of beam subspaces being predetermined.

In Example 26, the subject matter of any one of Examples 24 or 25 can optionally include the threshold channel quality metric of the plurality of beam subspaces being a fraction of a channel quality metric associated with a highest modulation coding scheme (MCS) index among each of the plurality of beam directions that are representative of the plurality of beam subspaces.

In Example 27, the subject matter of any one of Examples 24 to 26 can optionally include the threshold channel quality metric of the plurality of beam subspaces being modified based on an update to the estimated channel spatial coherence.

In Example 28, the subject matter of any one of Examples 25 to 27 can optionally include performing the bounding procedure by: reducing a number of the plurality of beam subspaces that may be selected by the terminal device based on the comparison.

In Example 29, the subject matter of Example 28 can optionally include the selected beam subspace being selected from the reduced number of the plurality of beam subspaces.

In Example 30, the subject matter of any one of Examples 1 to 29 can optionally include the selected beam subspace being selected based on a comparison of the channel quality metric of the beam direction that is representative of the selected beam subspace and a threshold channel quality metric of the plurality of beam subspaces.

In Example 31, the subject matter of any one of Examples 20 to 29 can optionally include performing the bounding procedure by: identifying an $N^{th}$ level beam subspace of the plurality of $N^{th}$ level beam subspaces based on a channel quality metric of the beam direction that is representative of the identified $N^{th}$ level beam subspace.

In Example 32, the subject matter of Example 31 can optionally include the identified $N^{th}$ level beam subspace corresponds to the selected beam subspace.

In Example 33, the subject matter of any one of Examples 31 or 32 can optionally include performing the bounding procedure by: comparing the channel quality metric of the beam direction that is representative of the identified $N^{th}$ level beam subspace with a threshold channel quality metric of the plurality of $N^{th}$ level beam subspaces.

In Example 34, the subject matter of Example 33 can optionally include the threshold channel quality metric of the plurality of $N^{th}$ level beam subspaces being predetermined.

In Example 35, the subject matter of any one of Examples 33 or 34 can optionally include the threshold channel quality metric of the plurality of $N^{th}$ level beam subspaces being modified based on an update to the estimated channel spatial coherence.

In Example 36, the subject matter of any one of Examples 33 to 35 can optionally include the threshold channel quality metric of the plurality of $N^{th}$ level beam subspaces being a fraction of a channel quality metric associated with a highest MCS index of the beam space.

In Example 37, the subject matter of any one of Examples 33 to 36 can optionally include performing the bounding procedure by: reducing a number of the plurality of $N^{th}$ level beam subspaces that may be selected by the terminal device based on the $N^{th}$ level comparison.

In Example 38, the subject matter of Example 37 can optionally include the selected $N^{th}$ level beam subspace being selected from the reduced number of the plurality of $N^{th}$ level beam subspaces.

In Example 39, the subject matter of any one of Examples 14 to 38 can optionally include the selected $N^{th}$ level beam subspace being selected based on a comparison of the channel quality metric of the $N^{th}$ level beam direction that is representative of the selected $N^{th}$ level beam subspace and a threshold channel quality metric of the plurality of $N^{th}$ level beam subspaces.

In Example 40, the subject matter of any one of Examples 14 to 39 can optionally include the channel quality metric of the beam direction that is representative of the selected $N^{th}$ level beam subspace being associated with a highest MCS index of the beam space.

In Example 41, the subject matter of any one of Examples 20 to 22 can optionally include performing the bounding procedure by: identifying a channel quality metric for each of the plurality of beam directions that are representative of the respective beam subspaces.

In Example 42, the subject matter of any one of Examples 20 to 22, or 41 can optionally include performing the bounding procedure by: determining a channel quality metric associated with a highest MCS index among each of the plurality of beam directions that are representative of the plurality of beam subspaces.

In Example 43, the subject matter of Example 42 can optionally include the selected beam subspace includes the beam direction associated with the determined channel quality metric of the plurality of beam subspaces.

In Example 44, the subject matter of Example 43 can optionally include performing the bounding procedure by: identifying a channel quality metric for each of the plurality of $N^{th}$ level beam directions that are representative of the plurality of $N^{th}$ level beam subspaces corresponding to the selected beam subspace.

In Example 45, the subject matter of Example 44 can optionally include performing the bounding procedure by: determining a channel quality metric that is associated with a highest MCS index among each of the plurality of $N^{th}$ level beam directions that are representative of the plurality of $N^{th}$ level beam subspaces corresponding to the selected beam subspace.

In Example 46, the subject matter of Example 45 can optionally include the selected $N^{th}$ level beam subspace includes the $N^{th}$ level beam direction associated with the determined channel quality metric of the plurality of $N^{th}$ level beam subspaces.

In Example 47, the subject matter of any one of Examples 45 or 46 can optionally include performing the bounding procedure by: reducing a number of the plurality of beam subspaces that may be selected by the terminal device based on a comparison to the determined channel quality metric of the plurality of beam subspaces and the determined channel quality metric of the plurality of $N^{th}$ level beam subspaces.

In Example 48, the subject matter of Example 47 can optionally include the selected beam subspace being selected from the reduced number of the plurality of beam subspaces.

In Example 49, the subject matter of any one of Examples 14 to 48 can optionally include the selected $N^{th}$ level beam subspace being selected based on a comparison of the channel quality metric of the $N^{th}$ level beam direction that is representative of the selected $N^{th}$ level beam subspace and a threshold channel quality metric of the plurality of $N^{th}$ level beam subspaces.

In Example 50, the subject matter of any one of Examples 14 to 49 can optionally include the channel quality metric of the $N^{th}$ level beam direction that is representative of the selected $N^{th}$ level beam subspace being associated with the highest modulation coding scheme (MCS) index of the beam space.

In Example 51, the subject matter any one of Examples 1, and 3 to 50 may further include: generating, by the terminal device, a feedback signal indicating the beam direction that is representative of the selected beam space.

In Example 52, the subject matter of any one of Examples 2 or 51 may further include: communicating with an access node based on the feedback signal indicating the beam direction that is representative of the selected beam space.

In Example 53, the subject matter any one of Examples 14 to 52 may further include: generating, by the terminal device, a feedback signal indicating the $N^{th}$ level beam direction that is representative of the selected $N^{th}$ level beam subspace.

In Example 54, the subject matter of Example 53 may further include: communicating with an access node based on the feedback signal indicating the $N^{th}$ level beam direction that is representative of the selected $N^{th}$ level beam subspace.

Example 55 is a device for three-dimensional beamforming, in which the device may include: an estimation circuit configured to estimate a channel spatial coherence for a beam space of a device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; and a selection circuit configured to select a beam subspace of the plurality of beam subspaces based on a channel quality metric of the beam direction that is representative of the beam subspace.

Example 56 is a device for three-dimensional beamforming, in which the device may include: an estimation circuit configured to estimate a channel spatial coherence for a beam space of a device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; a selection circuit configured to select a beam subspace of the plurality of beam subspaces based on a channel quality metric of the beam direction that is representative of the selected beam subspace; and a processing circuit, configured to generate a feedback signal indicating the beam direction that is representative of the beam space.

In Example 57, the subject matter of any one of Examples 55 or 56 may further include: a plurality of receiver antennas configured to receive the plurality of non-precoded reference signals, wherein the estimate of the channel spatial coherence is based on a distance between the plurality of receiver antennas.

In Example 58, the subject matter of any one of Examples 55 to 57 can optionally include the estimation circuit being further configured to: estimate the channel spatial coherence based on angle of arrival information of the plurality of non-precoded reference signals.

In Example 59, the subject matter of any one of Examples 55 to 58 can optionally include the estimation circuit being further configured to: update the estimated channel spatial coherence based on changes in the plurality of non-precoded reference signals.

In Example 60, the subject matter of any one of Examples 55 or 56 can optionally include the estimation circuit being further configured to: estimate the channel spatial coherence based on a minimum expected spatial coherence.

In Example 61, the subject matter of any one of Examples 55 to 60 may further include: a branching circuit configured to define the plurality of beam subspaces from the beam space based on the estimated channel spatial coherence.

In Example 62, the subject matter of any one of Examples 55 to 61 can optionally include at least two of the plurality of beam subspaces being overlapping.

In Example 63, the subject matter of any one of Examples 55 to 61 can optionally include the plurality of beam subspaces being mutually disjoint.

In Example 64, the subject matter of any one of Examples 55 to 63 can optionally include the union of the plurality of beam subspaces being equal to the beam space.

In Example 65, the subject matter of any one of Examples 61 to 64 can optionally include the branching circuit being further configured to: define each of the plurality of beam subspaces to comprise a plurality of beam directions representative of the respective beam subspaces, wherein each of the plurality of beam directions is associated with a channel quality metric within a threshold range of the respective beam subspace.

In Example 66, the subject matter of Example 65 can optionally include the threshold range of the respective beam subspace being based on a difference from a mean of the channel quality metrics of the respective beam subspace, a difference from a median of the channel quality metrics of the respective beam subspace, a variance of the channel quality metrics of the respective beam subspace, or a standard deviation of the channel quality metrics of the respective beam subspace.

In Example 67, the subject matter of any one of Examples 61 to 66 can optionally include the branching circuit being further configured to: define a plurality of $N^{th}$ level beam subspaces from each of the plurality of beam subspaces based on the estimated channel spatial coherence, each of the plurality of $N^{th}$ level beam subspaces including an $N^{th}$ level beam direction that is representative of a respective $N^{th}$ level beam subspace of the plurality of $N^{th}$ level beam subspaces.

In Example 68, the subject matter of Example 67 can optionally include the selection circuit being further configured to: select an $N^{th}$ level beam subspace from the plurality of $N^{th}$ level beam subspaces based on a channel quality metric of the $N^{th}$ level beam direction that is representative of the $N^{th}$ level beam subspace.

In Example 69, the subject matter of any one of Examples 67 or 68 can optionally include each of the plurality of beam subspaces respectively correspond to the plurality of $N^{th}$ level beam subspaces.

In Example 70, the subject matter of any one of Examples 67 to 69 can optionally include the union of the plurality of $N^{th}$ level beam subspaces being equal to the beam space.

In Example 71, the subject matter of any one of Examples 67 to 70 can optionally include the branching circuit being configured to: define each of the plurality of $N^{th}$ level beam subspaces to comprise at least one $N^{th}$ level beam direction representative of the respective $N^{th}$ level beam subspace, wherein each of the plurality of $N^{th}$ level beam directions is associated with a channel quality metric within a range of the respective $N^{th}$ level beam subspace.

In Example 72, the subject matter of Example 71 can optionally include the range of the respective $N^{th}$ level beam subspace being based on a difference from a mean of the channel quality metrics of the respective $N^{th}$ level beam subspace, a difference from a median of the channel quality metrics of the respective $N^{th}$ level beam subspace, a variance of the channel quality metrics of the respective $N^{th}$ level beam subspace, or a standard deviation of the channel quality metrics of the respective $N^{th}$ level beam subspace.

In Example 73, the subject matter of any one of Examples 67 to 72 can optionally include the branching circuit being configured to: define a plurality of N−1 level beam subspaces from each of the plurality of beam subspaces based on the estimated channel spatial coherence, each of the plurality of N−1 level beam subspaces including an N−1 level beam direction representative of a respective N−1 level beam subspace of the N−1 level beam subspaces, and define a plurality of $N^{th}$ level beam subspaces from each of the plurality of N−1 level beam subspaces based on the estimated channel spatial coherence, each of the plurality of $N^{th}$ level beam subspaces including an $N^{th}$ level beam direction representative of a respective $N^{th}$ level beam subspace of the plurality of $N^{th}$ level beam subspaces.

In Example 74, the subject matter of any one of Examples 55 to 73 may further include: a bounding circuit configured to perform a bounding procedure on the plurality of beam subspaces that may be selected by the selection circuit.

In Example 75, the subject matter of Example 74 can optionally include the bounding procedure comprises a predetermined number of stages.

In Example 76, the subject matter of Example 74 or 75 can optionally include the bounding procedure comprises a variable number of stages.

In Example 77, the subject matter of any one of Examples 74 to 76 can optionally include the bounding circuit being further configured to: identify a beam subspace of the plurality of beam subspaces based on a channel quality metric of the beam direction that is representative of the identified beam subspace.

In Example 78, the subject matter of Example 77 can optionally include the bounding circuit being further configured to: comparing the channel quality metric of the beam direction that is representative of the identified beam subspace and a threshold channel quality metric of the plurality of beam subspaces.

In Example 79, the subject matter of Example 78 can optionally include the threshold channel quality metric of the plurality of beam subspaces being predetermined.

In Example 80, the subject matter of any one of Examples 78 or 79 can optionally include the threshold channel quality metric of the plurality of beam subspaces being a fraction of a channel quality metric associated with a highest modulation coding scheme (MCS) index among each of the plurality of beam directions that are representative of the plurality of beam subspaces.

In Example 81, the subject matter of any one of Examples 78 to 80 can optionally include the threshold channel quality metric of the plurality of beam subspaces being modified based on an update to the estimated channel spatial coherence.

In Example 82, the subject matter of any one of Examples 79 to 81 can optionally include the bounding circuit being further configured to: reduce a number of the plurality of beam subspaces that may be selected by the selection circuit based on the comparison.

In Example 83, the subject matter of Example 82 can optionally include the selected beam subspace being selected from the reduced number of the plurality of beam subspaces.

In Example 84, the subject matter of any one of Examples 55 to 83 can optionally include the selected beam subspace being selected based on a comparison of the channel quality metric of the beam direction that is representative of the selected beam subspace and a threshold channel quality metric of plurality of beam subspaces.

In Example 85, the subject matter of any one of Examples 74 to 84 can optionally include the bounding circuit being further configured to: identify an $N^{th}$ level beam subspace of the plurality of $N^{th}$ level beam subspaces based on a channel quality metric of the $N^{th}$ level beam direction that is representative of the identified $N^{th}$ level beam subspace.

In Example 86, the subject matter of Example 85 can optionally include the identified $N^{th}$ level beam subspace corresponds to the selected beam subspace.

In Example 87, the subject matter of any one of Examples 85 or 86 can optionally include the bounding circuit being further configured to: compare the channel quality metric of the $N^{th}$ level beam direction that is representative of the identified $N^{th}$ level beam subspace with a threshold channel quality metric of the plurality of $N^{th}$ level beam subspaces.

In Example 88, the subject matter of Example 87 can optionally include the threshold channel quality metric of the plurality of $N^{th}$ level beam subspaces being predetermined.

In Example 89, the subject matter of any one of Examples 87 or 88 can optionally include the threshold channel quality metric of the plurality of $N^{th}$ level beam subspaces being modified based on an update to the estimated channel spatial coherence.

In Example 90, the subject matter of any one of Examples 87 to 89 can optionally include the threshold channel quality metric of the plurality of $N^{th}$ level beam subspaces being a fraction of a channel quality metric associated with a highest MCS index of the beam space.

In Example 91, the subject matter of any one of Examples 87 to 90 can optionally include the bounding circuit being further configured to: reduce a number of the plurality of $N^{th}$ level beam subspaces that may be selected by the selection circuit based on the $N^{th}$ level comparison.

In Example 92, the subject matter of Example 91 can optionally include the selected $N^{th}$ level beam subspace being selected from the reduced number of the plurality of $N^{th}$ level beam subspaces.

In Example 93, the subject matter of any one of Examples 68 to 92 can optionally include the selected $N^{th}$ level beam subspace being selected based on a comparison of the channel quality metric of the $N^{th}$ level beam direction that is representative of the selected $N^{th}$ level beam subspace and a threshold channel quality metric of plurality of $N^{th}$ level beam subspaces.

In Example 94, the subject matter of any one of Examples 68 to 93 can optionally include the channel quality metric of the $N^{th}$ level beam direction that is representative of the selected $N^{th}$ level beam subspace being associated with a highest MCS index of the beam space.

In Example 95, the subject matter of any one of Examples 74 to 76 can optionally include the bounding circuit being further configured to: identify a channel quality metric for each of the plurality of beam directions that are representative of the respective beam subspaces.

In Example 96, the subject matter of any one of Examples 75 to 76, or 95 can optionally include the bounding circuit being further configured to: determine a channel quality metric associated with a highest MCS index among each of the plurality of beam directions that are representative of the plurality of beam subspaces.

In Example 97, the subject matter of Example 96 can optionally include the selected beam subspace includes the beam direction associated with the determined channel quality metric of the plurality of beam subspaces.

In Example 98, the subject matter of Example 97 can optionally include the bounding circuit being further configured to: identify a channel quality metric for each of the $N^{th}$ level beam directions that are representative of $N^{th}$ level beam subspaces corresponding to the selected beam subspace.

In Example 99, the subject matter of Example 98 can optionally include the bounding circuit being further configured to: determine a channel quality metric that is associated with a highest MCS index among each of the $N^{th}$ level beam directions that are representative of the plurality of $N^{th}$ level beam subspaces corresponding to the selected beam subspace.

In Example 100, the subject matter of Example 99 can optionally include the selected $N^{th}$ level beam subspace includes the $N^{th}$ level beam direction associated with the determined channel quality metric of the plurality of $N^{th}$ level beam subspaces.

In Example 101, the subject matter of any one of Examples 99 or 100 can optionally include the bounding circuit being further configured to: reduce a number of the plurality of $N^{th}$ level beam subspaces that may be selected by the selection circuit based on a comparison to the determined channel quality metric of the plurality of beam subspaces and the determined channel quality metric of the plurality of $N^{th}$ level beam subspaces.

In Example 102, the subject matter of Example 101 can optionally include the selected $N^{th}$ level beam subspace being selected from the reduced number of the plurality of $N^{th}$ level beam subspaces.

In Example 103, the subject matter of any one of Examples 68 to 102 can optionally include the selected $N^{th}$ level beam subspace being selected based on a comparison of the channel quality metric of the $N^{th}$ level beam direction that is representative of the selected $N^{th}$ level beam subspace and a threshold channel quality metric of $N^{th}$ level beam subspaces.

In Example 104, the subject matter of any one of Examples 68 to 104 can optionally include the channel quality metric of the $N^{th}$ level beam direction that is representative of the selected $N^{th}$ level beam subspace being associated with the highest modulation coding scheme (MCS) index of the beam space.

In Example 105, the subject matter any one of Examples 55, and 57 to 104 may further include: a processing circuit configured to generate a feedback signal indicating the beam direction that is representative of the selected beam space.

In Example 106, the subject matter of any one of Examples 56 or 105 can optionally include the processing circuit being further configured to: communicate with an access node based on the feedback signal indicating the beam direction that is representative of the selected beam space.

In Example 107, the subject matter any one of Examples 68 to 106 can optionally include the processing circuit being further configured to: generate a feedback signal indicating the $N^{th}$ level beam direction that is representative of the selected $N^{th}$ level beam subspace.

In Example 108, the subject matter of Example 107 can optionally include the processing circuit being further configured to: communicate with the access node based on the feedback signal indicating the $N^{th}$ level beam direction that is representative of the selected $N^{th}$ level beam subspace.

Example 109 is a computing device comprising processing circuitry configured to perform the method of any one of Examples 1 to 54.

Example 110 is a processing circuit configured to perform the method of any one of Examples 1 to 54.

Example 111 is a non-transitory computer readable medium storing instructions that when executed by a processor cause the processor to perform the method of any one of Examples 1 to 54.

Example 112 is a non-transitory computer readable medium storing instructions that when executed by processing circuitry of a computing device cause the computing device to perform the method of any one of Examples 1 to 54.

Example 113 is a non-transitory computer readable medium storing instructions that when executed by processing circuitry of a device cause the device to perform a method which may include: estimating a channel spatial coherence for a beam space of a terminal device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; and selecting, by the terminal device, a beam subspace of the plurality of beam subspaces based on a channel quality metric of the beam direction that is representative of the beam subspace.

Example 114 is a non-transitory computer readable medium storing instructions that when executed by processing circuitry of a device cause the device to perform a method which may include: estimating a channel spatial coherence for a beam space of a terminal device based on a plurality of non-precoded reference signals, the beam space comprising a plurality of beam subspaces based on the estimated channel spatial coherence, each of the plurality of beam subspaces including a beam direction representative of a respective beam subspace of the plurality of beam subspaces; selecting, by the terminal device, a beam subspace of the plurality of beam subspaces based on a channel quality metric of the beam direction that is representative of the beam subspace; and generating, by the terminal device, a feedback signal indicating the beam direction that is representative of the selected beam space.

In Example 115, the subject matter of any one of Examples 113 or 114 may further include: receiving the plurality of non-precoded reference signals at a plurality of receiver antennas of the terminal device, wherein estimating the channel spatial coherence is based on a distance between the plurality of receiver antennas.

In Example 116, the subject matter of any one of Examples 113 to 115 can optionally include estimating the channel spatial coherence by: estimating the channel spatial coherence based on angle of arrival information of the plurality of non-precoded reference signals.

In Example 117, the subject matter of any one of Examples 113 to 116 may further include: updating the estimated channel spatial coherence based on changes in the plurality of non-precoded reference signals.

In Example 118, the subject matter of any one of Examples 113 or 114 can optionally include estimating the channel spatial coherence by: estimating the channel spatial coherence based on a minimum expected spatial coherence.

In Example 119, the subject matter of any one of Examples 113 to 118 may further include: defining the plurality of beam subspaces from the beam space based on the estimated channel spatial coherence.

In Example 120, the subject matter of any one of Examples 113 to 119 can optionally include at least two of the plurality of beam subspaces being overlapping.

In Example 121, the subject matter of any one of Examples 113 to 119 can optionally include the plurality of beam subspaces being mutually disjoint.

In Example 122, the subject matter of any one of Examples 113 to 121 can optionally include the union of the plurality of beam subspaces being equal to the beam space.

In Example 123, the subject matter of any one of Examples 119 to 122 can optionally include defining the plurality of beam subspaces from the beam space by: defining each of the plurality of beam subspaces to comprise a plurality of beam directions including the beam direction that is representative of the respective beam subspace, each of the plurality of beam directions having a channel quality metric associated therewith that is within a threshold range of the respective beam subspace.

In Example 124, the subject matter of Example 123 can optionally include the threshold range of the respective beam subspace being based on a difference from a mean of the channel quality metrics of the respective beam subspace, a difference from a median of the channel quality metrics of the respective beam subspace, a variance of the channel quality metrics of the respective beam subspace, or a standard deviation of the channel quality metrics of the respective beam subspace.

In Example 125, the subject matter of any one of Examples 119 to 124 can optionally include defining the plurality of beam subspaces from the beam space by: defining a plurality of $N^{th}$ level beam subspaces from each of the plurality of beam subspaces based on the estimated channel spatial coherence, each of the plurality of $N^{th}$ level beam subspaces including an $N^{th}$ level beam direction that is representative of a respective $N^{th}$ level subspace of the plurality of $N^{th}$ level beam subspaces.

In Example 126, the subject matter of Example 125 may further include: selecting, by the terminal device, an $N^{th}$ level beam subspace from the plurality of $N^{th}$ level beam subspaces based on a channel quality metric of the $N^{th}$ level beam direction that is representative of the selected $N^{th}$ level beam subspace.

In Example 127, the subject matter of any one of Examples 125 or 126 can optionally include each of the plurality of beam subspaces respectively correspond to the plurality of $N^{th}$ level beam subspaces.

In Example 128, the subject matter of any one of Examples 125 to 127 can optionally include the union of the plurality of $N^{th}$ level beam subspaces being equal to the beam space.

In Example 129, the subject matter of any one of Examples 125 to 128 can optionally include defining the plurality of $N^{th}$ level beam subspaces from each of the plurality of beam subspace by: defining each of the plurality of $N^{th}$ level beam subspaces to comprise at least one $N^{th}$ level beam direction including the $N^{th}$ level beam direction that is representative of the respective $N^{th}$ level subspace, each of the $N^{th}$ level beam directions having a channel quality metric associated therewith that is within a range of the respective $N^{th}$ level beam subspace.

In Example 130, the subject matter of Example 129 can optionally include the range of the respective $N^{th}$ level beam subspace being based on a difference from a mean of the channel quality metrics of the respective $N^{th}$ level beam subspace, a difference from a median of the channel quality metrics of the respective $N^{th}$ level beam subspace, a variance of the channel quality metrics of the respective $N^{th}$ level beam subspace, or a standard deviation of the channel quality metrics of the respective $N^{th}$ level beam subspace.

In Example 131, the subject matter of Examples 125 to 130 can optionally include defining the plurality of $N^{th}$ level beam subspaces from each of the plurality of beam subspace by: defining a plurality of N−1 level beam subspaces from each of the plurality of beam subspaces based on the estimated channel spatial coherence, each of the N−1 level beam subspaces including an N−1 level beam direction that is representative of a respective N−1 level subspace of the plurality of N−1 level beam subspaces, and defining a plurality of $N^{th}$ level beam subspaces from each of the plurality of N−1 level beam subspaces based on the estimated channel spatial coherence, each of the plurality of $N^{th}$ level beam subspaces including an $N^{th}$ level beam direction that is representative of a respective $N^{th}$ level subspace of the plurality of $N^{th}$ level beam subspaces.

In Example 132, the subject matter of any one of Examples 1 to 131 may further include: performing a bounding procedure on the plurality of beam subspaces that may be selected by the terminal device.

In Example 133, the subject matter of Example 132 can optionally include performing the bounding procedure comprises a predetermined number of stages.

In Example 134, the subject matter of Example 132 can optionally include performing the bounding procedure comprises a variable number of stages.

In Example 135, the subject matter of any one of Examples 132 to 134 can optionally include performing the bounding procedure by: identifying a beam subspace of the plurality of beam subspaces based on a channel quality metric of the beam direction that is representative of the identified beam subspace.

In Example 136, the subject matter of Example 135 can optionally include performing the bounding procedure by: comparing the channel quality metric of the beam direction that is representative of the identified beam subspace and a threshold channel quality metric of the plurality of beam subspaces.

In Example 137, the subject matter of Example 136 can optionally include the threshold channel quality metric of the plurality of beam subspaces being predetermined.

In Example 138, the subject matter of any one of Examples 136 or 137 can optionally include the threshold channel quality metric of the plurality of beam subspaces being a fraction of a channel quality metric associated with a highest modulation coding scheme (MCS) index among each of the plurality of beam directions that are representative of the plurality of beam subspaces.

In Example 139, the subject matter of any one of Examples 136 to 138 can optionally include the threshold channel quality metric of the plurality of beam subspaces being modified based on an update to the estimated channel spatial coherence.

In Example 140, the subject matter of any one of Examples 136 to 139 can optionally include performing the bounding procedure by: reducing a number of the plurality of beam subspaces that may be selected by the terminal device based on the comparison.

In Example 141, the subject matter of Example 140 can optionally include the selected beam subspace being selected from the reduced number of the plurality of beam subspaces.

In Example 142, the subject matter of any one of Examples 113 to 141 can optionally include the selected beam subspace being selected based on a comparison of the channel quality metric of the beam direction that is representative of the selected beam subspace and a threshold channel quality metric of the plurality of beam subspaces.

In Example 143, the subject matter of any one of Examples 132 to 142 can optionally include performing the bounding procedure by: identifying an $N^{th}$ level beam subspace of the plurality of $N^{th}$ level beam subspaces based on a channel quality metric of the $N^{th}$ level beam direction that is representative of the identified $N^{th}$ level beam subspace.

In Example 144, the subject matter of Example 143 can optionally include the identified $N^{th}$ level beam subspace corresponds to the selected beam subspace.

In Example 145, the subject matter of any one of Examples 143 or 144 can optionally include performing the bounding procedure by: comparing the channel quality metric of the $N^{th}$ level beam direction that is representative of the identified $N^{th}$ level beam subspace with a threshold channel quality metric of the plurality of $N^{th}$ level beam subspaces.

In Example 146, the subject matter of Example 145 can optionally include the threshold channel quality metric of the plurality of $N^{th}$ level beam subspaces being predetermined.

In Example 147, the subject matter of any one of Examples 145 or 146 can optionally include the threshold channel quality metric of the plurality of $N^{th}$ level beam subspaces being modified based on an update to the estimated channel spatial coherence.

In Example 148, the subject matter of any one of Examples 145 to 147 can optionally include the threshold channel quality metric of the plurality of $N^{th}$ level beam subspaces being a fraction of a channel quality metric associated with a highest MCS index of the beam space.

In Example 149, the subject matter of any one of Examples 145 to 148 can optionally include performing the bounding procedure by: reducing a number of the plurality of $N^{th}$ level beam subspaces that may be selected by the terminal device based on the $N^{th}$ level comparison.

In Example 150, the subject matter of Example 149 can optionally include the selected $N^{th}$ level beam subspace being selected from the reduced number of the plurality of $N^{th}$ level beam subspaces.

In Example 151, the subject matter of any one of Examples 126 to 150 can optionally include the selected $N^{th}$ level beam subspace being selected based on a comparison of the channel quality metric of the $N^{th}$ level beam direction that is representative of the selected $N^{th}$ level beam subspace and a threshold channel quality metric of the plurality of $N^{th}$ level beam subspaces.

In Example 152, the subject matter of any one of Examples 126 to 151 can optionally include the channel quality metric of the $N^{th}$ level beam direction that is representative of the selected $N^{th}$ level beam subspace being associated with a highest MCS index of the beam space.

In Example 153, the subject matter of any one of Examples 132 to 134 can optionally include performing the bounding procedure by: identifying a channel quality metric for each of the plurality of beam directions that are representative of the respective beam subspaces.

In Example 154, the subject matter of any one of Examples 132 to 134, or 153 can optionally include performing the bounding procedure by: determining a channel quality metric associated with a highest MCS index among each of the plurality of beam directions that are representative of the plurality of beam subspaces.

In Example 155, the subject matter of Example 154 can optionally include the selected beam subspace includes the beam direction associated with the determined channel quality metric of the plurality of beam subspaces.

In Example 156, the subject matter of Example 155 can optionally include performing the bounding procedure by: identifying a channel quality metric for each of the plurality of $N^{th}$ level beam directions that are representative of the plurality of $N^{th}$ level beam subspaces corresponding to the selected beam subspace.

In Example 157, the subject matter of Example 156 can optionally include performing the bounding procedure by: determining a channel quality metric that is associated with a highest MCS index among each of the plurality of $N^{th}$ level beam directions that are representative of the plurality of $N^{th}$ level beam subspaces corresponding to the selected beam subspace.

In Example 158, the subject matter of Example 157 can optionally include the selected $N^{th}$ level beam subspace includes the $N^{th}$ level beam direction associated with the determined channel quality metric of the plurality of $N^{th}$ level beam subspaces.

In Example 159, the subject matter of any one of Examples 157 or 158 can optionally include performing the bounding procedure by: reducing a number of the plurality of $N^{th}$ level beam subspaces that may be selected by the terminal device based on a comparison to the determined channel quality metric of the plurality of beam subspaces and the determined channel quality metric of the plurality of $N^{th}$ level beam subspaces.

In Example 160, the subject matter of Example 159 can optionally include the selected $N^{th}$ level beam subspace being selected from the reduced number of the plurality of $N^{th}$ level beam subspaces.

In Example 161, the subject matter of any one of Examples 126 to 160 can optionally include the selected $N^{th}$ level beam subspace being selected based on a comparison of the channel quality metric of the $N^{th}$ level beam direction that is representative of the selected $N^{th}$ level beam subspace and a threshold channel quality metric of the plurality of $N^{th}$ level beam subspaces.

In Example 162, the subject matter of any one of Examples 126 to 161 can optionally include the channel quality metric of the $N^{th}$ level beam direction that is representative of the selected $N^{th}$ level beam subspace being associated with the highest modulation coding scheme (MCS) index of the beam space.

In Example 163, the subject matter any one of Examples 113, and 115 to 162 may further include: generating, by the terminal device, a feedback signal indicating the beam direction that is representative of the selected beam space.

In Example 164, the subject matter of any one of Examples 114 or 163 may further include: communicating with an access node based on the feedback signal indicating the beam direction that is representative of the selected beam space.

In Example 165, the subject matter any one of Examples 126 to 164 may further include: generating, by the terminal device, a feedback signal indicating the $N^{th}$ level beam direction that is representative of the selected $N^{th}$ level beam subspace.

In Example 166, the subject matter of Example 165 may further include: communicating with an access node based on the feedback signal indicating the $N^{th}$ level beam direction that is representative of the selected $N^{th}$ level beam subspace.

Example 167 may optionally replace the subject matter of Example 11. In Example 167, the subject matter of any one of Examples 7 to 10 can optionally include defining the plurality of beam subspaces from the beam space by: defining each of the plurality of beam subspaces to comprise a plurality of beam directions including the beam direction that is representative of respective beam subspaces, wherein each of the plurality of beam directions is associated with a channel quality metric within a threshold range of the respective beam subspace.

Example 168 may optionally replace the subject matter of Example 65. In Example 168, forth the subject matter of any one of Examples 61 to 64 can optionally include the branching circuit being further configured to: define each of the plurality of beam subspaces to comprise a plurality of beam directions including the beam direction that is representative of respective beam subspaces, wherein each of the plurality of beam directions is associated with a channel quality metric within a threshold range of the respective beam subspace.

Example 169 may optionally replace the subject matter of Example 123. In Example 169, the subject matter of any one of Examples 119 to 122 can optionally include defining the plurality of beam subspaces from the beam space by: defining each of the plurality of beam subspaces to comprise a plurality of beam directions including the beam direction that is representative of the respective beam subspace, wherein each of the plurality of beam directions is associated with a channel quality metric within a threshold range of the respective beam subspace.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The terminology used herein is for the purpose of describing particular example aspects only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example aspects.

While the disclosure has been particularly shown and described with reference to specific aspects, it should be understood by those skilled in the art that various changes in form and detail may be made therein without departing from the spirit and scope of the disclosure as defined by the appended claims. The various aspects of this disclosure are not necessarily mutually exclusive, as some aspects of this disclosure can be combined with one or more other aspects of this disclosure to form new aspects. The scope of the disclosure is thus indicated by the appended claims and all changes which come within the meaning and range of equivalency of the claims are therefore intended to be embraced.

What is claimed is:

1. A method for three-dimensional beamforming, the method comprising:
    estimating a channel spatial coherence for a beam space of a terminal device based on a plurality of non-precoded reference signals, the beam space comprising a plurality of beam subspaces, each of the plurality of beam subspaces including a beam direction representative of a respective beam subspace of the plurality of beam subspaces;
    defining the plurality of beam subspaces based on the estimated channel spatial coherence;
    performing a bounding procedure on the plurality of beam subspaces that may be selected by the terminal device; and
    selecting, by the terminal device, a beam subspace of the plurality of beam subspaces based on a channel quality metric of the beam direction that is representative of the beam subspace.

2. The method of claim 1,
    wherein defining the plurality of beam subspaces from the beam space comprises:
        defining each of the plurality of beam subspaces to comprise a plurality of beam directions representative of respective beam subspaces,
        wherein each of the plurality of beam directions is associated with a channel quality metric within a threshold range of the respective beam subspace.

3. The method of claim 1,
wherein defining the plurality of beam subspaces from the beam space comprises:
defining a plurality of Nth level beam subspaces from each of the plurality of beam subspaces based on the estimated channel spatial coherence, each of the plurality of Nth level beam subspaces including an Nth level beam direction representative of a respective Nth level beam subspace.

4. The method of claim 3,
wherein defining the Nth level beam subspaces from each of the plurality of beam subspaces comprises:
defining each of the plurality of Nth level beam subspaces to comprise at least one Nth level beam direction representative of the respective Nth level beam subspace,
wherein each of the at least one Nth level beam directions is associated with a channel quality metric within a range of the respective Nth level beam subspace.

5. The method of claim 3, further comprising:
selecting, by the terminal device, an Nth level beam subspace from the plurality of Nth level beam subspaces based on a channel quality metric of the Nth level beam direction that is representative of the Nth level beam subspace.

6. The method of claim 1,
wherein performing the bounding procedure comprises:
identifying a beam subspace of the plurality of beam subspaces based on a channel quality metric of the beam direction that is representative of the identified beam subspace.

7. The method of claim 6,
wherein performing the bounding procedure comprises:
comparing the channel quality metric of the beam direction that is representative of the identified beam subspace and a threshold channel quality metric of the plurality of beam subspaces.

8. The method of claim 7,
wherein the threshold channel quality metric of the plurality of beam subspaces is a fraction of a channel quality metric associated with a highest modulation coding scheme (MCS) index among each of the plurality of beam directions that are representative of the plurality of beam subspaces.

9. The method of claim 7,
wherein performing the bounding procedure comprises:
reducing a number of the plurality of beam subspaces that may be selected by the terminal device based on the comparison.

10. The method of claim 3, further comprising:
wherein performing the bounding procedure comprises:
identifying a channel quality metric for each of the beam directions that are representative of Nth level beam subspaces corresponding to the selected beam subspace; and
determining a channel quality metric that is associated with a highest MCS index among each of the beam directions that are representative of the Nth level beam subspaces corresponding to the selected beam subspace.

11. A device for three-dimensional beamforming, the device comprising:
an estimation circuit configured to estimate a channel spatial coherence for a beam space of a device based on a plurality of non-precoded reference signals, the beam space comprising a plurality of beam subspaces based on the estimated channel spatial coherence, each of the plurality of beam subspaces including a beam direction representative of a respective beam subspace;
a bounding circuit configured to perform a bounding procedure on the plurality of bean subspaces that may be selected by the device;
a selection circuit configured to select a beam subspace of the plurality of beam subspaces based on a channel quality metric of the beam direction that is representative of the selected bean subspace; and
a processing circuit configured to generate a feedback signal indicating the beam direction that is representative of the beam space.

12. The device of claim 11, further comprising:
a branching circuit configured to define each of the plurality of beam subspaces to comprise a plurality of beam directions representative of respective beam subspaces,
wherein each of the plurality of beam directions is associated with a channel quality metric within a threshold range of the respective beam subspace.

13. The device of claim 12,
wherein the branching circuit is further configured to define a plurality of Nth level beam subspaces from each of the plurality of beam subspaces based on the estimated channel spatial coherence, each of the plurality of Nth level beam subspaces including an Nth level beam direction that is representative of a respective Nth level beam subspace, and
wherein the selection circuit is further configured to select an Nth level beam subspace from the plurality of Nth level beam subspaces based on a channel quality metric of the Nth level beam direction that is representative of the Nth level beam subspace.

14. The device of claim 11, further comprising:
a plurality of receiver antennas configured to receive the plurality of non-precoded reference signals,
wherein the estimate of the channel spatial coherence is based on a distance between the plurality of receiver antennas.

15. The device of claim 13,
wherein the selected Nth level beam subspace is selected from the reduced number of the plurality of Nth level beam subspaces.

16. A non-transitory computer readable medium storing instructions that when executed by processing circuitry of a device cause the device to perform a method comprising:
estimating a channel spatial coherence for a beam space of a terminal device based on a plurality of non-precoded reference signals, the beam space comprising a plurality of beam subspaces, each of the plurality of beam subspaces including a beam direction representative of a respective beam subspace of the plurality of beam subspaces;
performing a bounding procedure on the plurality of beam subspaces that may be selected by the terminal device and
selecting, by the terminal device, a beam subspace of the plurality of beam subspaces based on a channel quality metric of the beam direction that is representative of the beam subspace.

17. The non-transitory computer readable medium of claim 16,
wherein performing the bounding procedure comprises:
identifying a beam subspace of the plurality of beam subspaces based on a channel quality metric of the beam direction that is representative of the identified beam subspace.

18. The non-transitory computer readable medium of claim 17,
wherein performing the bounding procedure comprises:
comparing the channel quality metric of the beam direction that is representative of the identified beam subspace and a threshold channel quality metric of the plurality of beam subspaces.

19. The non-transitory computer readable medium of claim 17,
wherein the threshold channel quality metric of the plurality of beam subspaces is a fraction of a channel quality metric associated with a highest modulation coding scheme (MCS) index among each of the plurality of beam directions that are representative of the plurality of beam subspaces.

20. The non-transitory computer readable medium of claim 17,
wherein performing the bounding procedure comprises:
reducing a number of the plurality of beam subspaces that may be selected by the terminal device based on the comparison.

\* \* \* \* \*